(12) United States Patent  
Matsueda et al.

(10) Patent No.: US 9,208,196 B2  
(45) Date of Patent: Dec. 8, 2015

(54) CONFIGURATION INFORMATION MANAGEMENT APPARATUS AND RETRIEVAL METHOD

(71) Applicant: FUJITSU LIMITED, Kawasaki-shi (JP)

(72) Inventors: Hiroki Matsueda, Kawasaki (JP); Kenichi Shimazaki, Yokohama (JP); Satoshi Matsuda, Yokohama (JP); Kazunao Muramoto, Yokohama (JP); Shinnosuke Nagakura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 348 days.

(21) Appl. No.: 13/737,167

(22) Filed: Jan. 9, 2013

(65) Prior Publication Data

US 2013/0246391 A1 Sep. 19, 2013

(30) Foreign Application Priority Data

Mar. 16, 2012 (JP) .................................. 2012-59709

(51) Int. Cl.
  *G06F 17/30* (2006.01)
  *G06F 11/34* (2006.01)

(52) U.S. Cl.
  CPC ...... *G06F 17/30442* (2013.01); *G06F 11/3409* (2013.01); *G06F 17/30389* (2013.01); *G06F 17/30448* (2013.01); *G06F 17/30566* (2013.01)

(58) Field of Classification Search
  CPC .................. G06F 17/30389; G06F 17/30448; G06F 17/30566; G06F 17/30637; G06F 11/3409
  See application file for complete search history.

(56) References Cited

U.S. PATENT DOCUMENTS 8,112,451 B1 * 2/2012 Graham et al. ............... 707/802
2011/0153565 A1 6/2011 Matsubara et al.

FOREIGN PATENT DOCUMENTS

| JP | H6-161844 | 6/1994 |
|----|-----------|--------|
| JP | 2000-222426 A | 8/2000 |
| JP | 2001-202388 A | 7/2001 |
| JP | 2009-223369 A | 10/2009 |
| JP | 2011-134005 A | 7/2011 |

* cited by examiner

*Primary Examiner* — Grace Park
(74) *Attorney, Agent, or Firm* — Fujitsu Patent Center

(57) ABSTRACT

A configuration information management apparatus includes a control unit which, generates a retrieval formula pattern representing a pattern of a first relationship retrieval formula which has been input, executes retrieval processing on the retrieval formula pattern, measures a state required for the retrieval processing which has been executed, determines whether or not the state satisfies a first condition, and when the first condition is satisfied, stores a retrieval condition relating to a retrieval subject configuration item in the retrieval formula pattern satisfying the first condition in a database as a short retrieval key, and retrieves, when a second relationship retrieval formula is input and a retrieval formula pattern of the second relationship retrieval formula satisfies a second condition, the retrieval subject configuration item in the second relationship retrieval formula, on the basis of the short retrieval key.

11 Claims, 34 Drawing Sheets

FIG. 4

Relationships
```
<relationship ID="Relx" type="GRelation">
<relationshipSource>01x</relationshipSource>
<relationshipDestination>11x</relationshipDestination>
</relationship>
<relationship ID="Relx+1" type="GRelation">
<relationshipSource>11x</relationshipSource>
<relationshipDestination>21x</relationshipDestination>
</relationship>
```

System CI
```
<item ID="01x" type="System">
<record type="observed">
<System systemName="SYSx" systemID="S_x"/>
</record>
</item>
```

Server CI
```
<item ID="11x" type="Server">
<record type="observed">
<Server serverName="Svx" IPaddress="192.168.0.x"/>
</record>
</item>
```

Software CI
```
<item ID="21x" type="Software">
<record type="observed">
<Software softwareName="SOFTx" softwareID="00x"/>
</record>
</item>
```

FIG. 5

System CIs

```xml
<item ID="01" type="System">
  <record type="observed">
    <System systemName="SYS1" systemID="S_1"/>
  </record>
</item>
<item ID="02" type="System">
  <record type="observed">
    <System systemName="SYS2" systemID="S_2"/>
  </record>
</item>
<item ID="03" type="System">
  <record type="observed">
    <System systemName="SYS3" systemID="S_3"/>
  </record>
</item>
<item ID="04" type="System">
  <record type="observed">
    <System systemName="SYS4" systemID="S_4"/>
  </record>
</item>
```

Server CIs

```xml
<item ID="11" type="Server">
  <record type="observed">
    <Server serverName="SV1" IPaddress="192.168.0.1"/>
  </record>
</item>
<item ID="12" type="Server">
  <record type="observed">
    <Server serverName="SV2" IPaddress="192.168.0.2"/>
  </record>
</item>
<item ID="13" type="Server">
  <record type="observed">
    <Server serverName="SV3" IPaddress="192.168.0.3"/>
  </record>
</item>
<item ID="14" type="Server">
  <record type="observed">
    <Server serverName="SV4" IPaddress="192.168.1.1"/>
  </record>
</item>
<item ID="15" type="Server">
  <record type="observed">
    <Server serverName="SV5" IPaddress="192.168.1.2"/>
  </record>
</item>
```

FIG. 6

Software CIs

```xml
<item ID="21" type="Software">
  <record type="observed">
    <Software softwareName="SOFT1" softwareID="001"/>
  </record>
</item>
<item ID="22" type="Software">
  <record type="observed">
    <Software softwareName="SOFT2" softwareID="002"/>
  </record>
</item>
<item ID="23" type="Software">
  <record type="observed">
    <Software softwareName="SOFT3" softwareID="003"/>
  </record>
</item>
<item ID="24" type="Software">
  <record type="observed">
    <Software softwareName="SOFTA" softwareID="004"/>
  </record>
</item>
<item ID="25" type="Software">
  <record type="observed">
    <Software softwareName="SOFTB" softwareID="005"/>
  </record>
</item>
```

Relationships

```xml
<relationship ID="Rel1" type="GRelation">
  <relationshipSource>01</relationshipSource>
  <relationshipDestination>11</relationshipDestination>
</relationship>
<relationship ID="Rel2" type="GRelation">
  <relationshipSource>01</relationshipSource>
  <relationshipDestination>12</relationshipDestination>
</relationship>
<relationship ID="Rel3" type="GRelation">
  <relationshipSource>02</relationshipSource>
  <relationshipDestination>13</relationshipDestination>
</relationship>
<relationship ID="Rel4" type="GRelation">
  <relationshipSource>11</relationshipSource>
  <relationshipDestination>21</relationshipDestination>
</relationship>
<relationship ID="Rel5" type="GRelation">
  <relationshipSource>11</relationshipSource>
  <relationshipDestination>22</relationshipDestination>
</relationship>
<relationship ID="Rel6" type="GRelation">
  <relationshipSource>12</relationshipSource>
  <relationshipDestination>23</relationshipDestination>
</relationship>
```

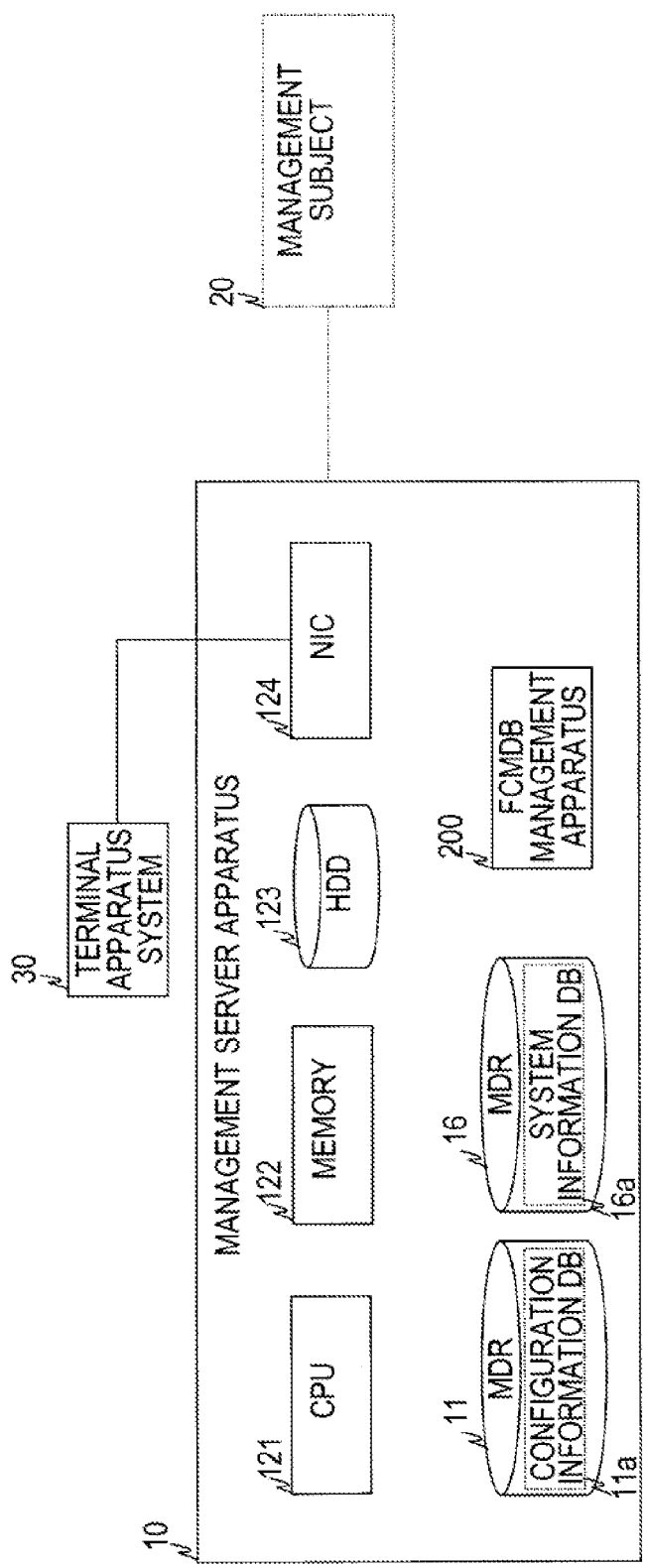

| FORMULA PATTERN | "SHORT RETRIEVAL KEY" EMBEDDING | FREQUENCY |
|---|---|---|
| /system/RLS/server[@serverName]/RLS/software | NOT YET | 1 |
| .. | .. | |

| FORMULA PATTERN | "SHORT RETRIEVAL KEY" EMBEDDING | FREQUENCY |
|---|---|---|
| /system[@systemName]/RLS/server | NOT YET | 12 |
| /system/RLS/server[@serverName]/RLS/software | NOT YET | 100 |
| .. | | |

FIG. 14

```
Software CIs
<item ID="21" type="Software">
   <record type="observed">
      <Software softwareName="SOFT1" softwareID="001"/>
      <System/>
      <Server serverName="SV1"/>
   </record>
</item>
<item ID="22" type="Software">
   <record type="observed">
      <Software softwareName="SOFT2" softwareID="002"/>
      <System/>
      <Server serverName="SV1"/>
   </record>
</item>
<item ID="23" type="Software">
   <record type="observed">
      <Software softwareName="SOFT3" softwareID="003"/>
      <System/>
      <Server serverName="SV2"/>
   </record>
</item>
<item ID="24" type="Software">
   <record type="observed">
      <Software softwareName="SOFTA" softwareID="004"/>
   </record>
</item>
<item ID="25" type="Software">
   <record type="observed">
      <Software softwareName="SOFTB" softwareID="005"/>
   </record>
</item>
```

FIG. 15

Software CIs

```
<item ID="21" type="Software">
<record type="observed">
<Software softwareName="SOFT1" softwareID="001"/>
<Server serverName="SV1">
    <System/>
</Server>
</record>
</item>
. . . . . .
```

| RELATIONSHIP SOURCE | RELATIONSHIP DESTINATION |
|---|---|
| 01 | 11 |
| 01 | 12 |
| 02 | 13 |
| 11 | 21 |
| 11 | 22 |
| 12 | 23 |

Tv

| ID | SERVER NAME | IP ADDRESS |
|---|---|---|
| 11 | SV1 | 192.168.0.1 |
| 12 | SV2 | 192.168.0.2 |
| 13 | SV3 | 192.168.0.3 |
| 14 | SV4 | 192.168.1.1 |
| 15 | SV5 | 192.168.1.2 |

Ts

| ID | SYSTEM NAME | SYSTEM ID |
|---|---|---|
| 01 | SYS1 | S_1 |
| 02 | SYS2 | S_2 |
| 03 | SYS3 | S_3 |
| 04 | SYS4 | S_4 |

Tf

| ID | SOFTWARE NAME | SOFTWARE ID |
|---|---|---|
| 21 | SOFT1 | 001 |
| 22 | SOFT2 | 002 |
| 23 | SOFT3 | 003 |
| 24 | SOFTA | 004 |
| 25 | SOFTB | 005 |

| ID | SYSTEM NAME | SYSTEM ID |
|----|-------------|-----------|
| 01 | SYS1 | S_1 |
| 02 | SYS2 | S_2 |
| 03 | SYS3 | S_3 |
| 04 | SYS4 | S_4 |

Tv

| ID | SERVER NAME | IP ADDRESS |
|----|-------------|------------|
| 11 | SV1 | 192.168.0.1 |
| 12 | SV2 | 192.168.0.2 |
| 13 | SV3 | 192.168.0.3 |
| 14 | SV4 | 192.168.1.1 |
| 15 | SV5 | 192.168.1.2 |

Tr

| RELATIONSHIP SOURCE | RELATIONSHIP DESTINATION |
|---------------------|--------------------------|
| 01 | 11 |
| 01 | 12 |
| 02 | 13 |
| 11 | 21 |
| 11 | 22 |
| 12 | 23 |

Tf

| ID | SOFTWARE NAME | SOFTWARE ID | SYSTEM | SERVER NAME |
|----|---------------|-------------|--------|-------------|
| 21 | SOFT1 | 001 | (RELATED) | SV1 |
| 22 | SOFT2 | 002 | (RELATED) | SV1 |
| 23 | SOFT3 | 003 | (RELATED) | SV2 |
| 24 | SOFTA | 004 | (UNRELATED) | (UNRELATED) |
| 25 | SOFTB | 005 | (UNRELATED) | (UNRELATED) |

"SHORT RETRIEVAL KEY" spans SYSTEM and SERVER NAME columns.

FIG. 22

```
                                    UPDATE
   Server CIs
<item ID="11" type="Server">
   <record type="observed">
      <Server serverName="SV1_01" IPaddress="192.168.0.1"/>
   </record>
</item>
<item ID="12" type="Server">
   <record type="observed">
      <Server serverName="SV2" IPaddress="192.168.0.2"/>
   </record>
</item>
<item ID="13" type="Server">
   <record type="observed">
      <Server serverName="SV3" IPaddress="192.168.0.3"/>
   </record>
</item>
<item ID="14" type="Server">
   <record type="observed">
      <Server serverName="SV4" IPaddress="192.168.1.1"/>
   </record>
</item>
<item ID="15" type="Server">
   <record type="observed">
      <Server serverName="SV5" IPaddress="192.168.1.2"/>
   </record>
</item>
```

FIG. 23

```
Software CIs
<item ID="21" type="Software">
   <record type="observed">
      <Software softwareName="SOFT1" softwareID="001"/>
      <System/>
      <Server serverName="SV1_01"/>   ◄------- UPDATE
   </record>
</item>
<item ID="22" type="Software">
   <record type="observed">
      <Software softwareName="SOFT2" softwareID="002"/>
      <System/>
      <Server serverName="SV1_01"/>   ◄------- UPDATE
   </record>
</item>
<item ID="23" type="Software">
   <record type="observed">
      <Software softwareName="SOFT3" softwareID="003"/>
      <System/>
      <Server serverName="SV2"/>
   </record>
</item>
<item ID="24" type="Software">
   <record type="observed">
      <Software softwareName="SOFTA" softwareID="004"/>
   </record>
</item>
<item ID="25" type="Software">
   <record type="observed">
      <Software softwareName="SOFTB" softwareID="005"/>
   </record>
</item>
```

| ID | SYSTEM NAME | SYSTEM ID |
|----|-------------|-----------|
| 01 | SYS1 | S_1 |
| 02 | SYS2 | S_2 |
| 03 | SYS3 | S_3 |
| 04 | SYS4 | S_4 |

Tv

| ID | SERVER NAME | IP ADDRESS |
|----|-------------|------------|
| 11 | SV1_01 | 192.168.0.1 |
| 12 | SV2 | 192.168.0.2 |
| 13 | SV3 | 192.168.0.3 |
| 14 | SV4 | 192.168.1.1 |
| 15 | SV5 | 192.168.1.2 |

Tr

| RELATIONSHIP SOURCE | RELATIONSHIP DESTINATION |
|---------------------|--------------------------|
| 01 | 11 |
| 01 | 12 |
| 02 | 13 |
| 11 | 21 |
| 11 | 22 |
| 12 | 23 |

Tf

| ID | SOFTWARE NAME | SOFTWARE ID |
|----|---------------|-------------|
| 21 | SOFT1 | 001 |
| 22 | SOFT2 | 002 |
| 23 | SOFT3 | 003 |
| 24 | SOFTA | 004 |
| 25 | SOFTB | 005 |

"SHORT RETRIEVAL KEY"

| SYSTEM | SERVER NAME |
|--------|-------------|
| (RELATED) | SV1_01 |
| (RELATED) | SV1_01 |
| (RELATED) | SV2 |
| (UNRELATED) | (UNRELATED) |
| (UNRELATED) | (UNRELATED) |

FIG. 26

Relationships

```
<relationship ID="Rel1" type="GRelation">
    <relationshipSource>01</relationshipSource>
    <relationshipDestination>11</relationshipDestination>
</relationship>
<relationship ID="Rel2" type="GRelation">
    <relationshipSource>01</relationshipSource>
    <relationshipDestination>12</relationshipDestination>
</relationship>
<relationship ID="Rel3" type="GRelation">
    <relationshipSource>02</relationshipSource>
    <relationshipDestination>13</relationshipDestination>
</relationship>
<relationship ID="Rel4" type="GRelation">
    <relationshipSource>11</relationshipSource>
    <relationshipDestination>21</relationshipDestination>
</relationship>
<relationship ID="Rel5" type="GRelation">
    <relationshipSource>11</relationshipSource>
    <relationshipDestination>22</relationshipDestination>
</relationship>
<relationship ID="Rel6" type="GRelation">
    <relationshipSource>12</relationshipSource>
    <relationshipDestination>23</relationshipDestination>
</relationship>
<relationship ID="Rel7" type="GRelation">
    <relationshipSource>11</relationshipSource>
    <relationshipDestination>24</relationshipDestination>
</relationship>
```
~ ADD

FIG. 27

```
Software CIs
<item ID="21" type="Software">
  <record type="observed">
    <Software softwareName="SOFT1" softwareID="001"/>
    <System/>
    <Server serverName="SV1"/>
  </record>
</item>
<item ID="22" type="Software">
  <record type="observed">
    <Software softwareName="SOFT2" softwareID="002"/>
    <System/>
    <Server serverName="SV1"/>
  </record>
</item>
<item ID="23" type="Software">
  <record type="observed">
    <Software softwareName="SOFT3" softwareID="003"/>
    <System/>
    <Server serverName="SV2"/>
  </record>
</item>
<item ID="24" type="Software">
  <record type="observed">
    <Software softwareName="SOFTA" softwareID="004"/>
    <System/>
    <Server serverName="SV1"/>
  </record>
</item>
<item ID="25" type="Software">
  <record type="observed">
    <Software softwareName="SOFTB" softwareID="005"/>
  </record>
</item>
```

| RELATIONSHIP SOURCE | RELATIONSHIP DESTINATION |
|---|---|
| 01 | 11 |
| 01 | 12 |
| 02 | 13 |
| 11 | 21 |
| 11 | 22 |
| 12 | 23 |
| 11 | 24 |

Tv

| ID | SERVER NAME | IP ADDRESS |
|---|---|---|
| 11 | SV1 | 192.168.0.1 |
| 12 | SV2 | 192.168.0.2 |
| 13 | SV3 | 192.168.0.3 |
| 14 | SV4 | 192.168.1.1 |
| 15 | SV5 | 192.168.1.2 |

Ts

| ID | SYSTEM NAME | SYSTEM ID |
|---|---|---|
| 01 | SYS1 | S_1 |
| 02 | SYS2 | S_2 |
| 03 | SYS3 | S_3 |
| 04 | SYS4 | S_4 |

Tf

| ID | SOFTWARE NAME | SOFTWARE ID | SYSTEM | SERVER NAME |
|---|---|---|---|---|
| 21 | SOFT1 | 001 | (RELATED) | SV1 |
| 22 | SOFT2 | 002 | (RELATED) | SV1 |
| 23 | SOFT3 | 003 | (RELATED) | SV2 |
| 24 | SOFTA | 004 | (RELATED) | SV1 |
| 25 | SOFTB | 005 | (UNRELATED) | (UNRELATED) |

"SHORT RETRIEVAL KEY"

FIG. 30

```
Relationships
<relationship ID="Rel1" type="GRelation">
   <relationshipSource>01</relationshipSource>
   <relationshipDestination>11</relationshipDestination>
</relationship>
<relationship ID="Rel2" type="GRelation">
   <relationshipSource>01</relationshipSource>
   <relationshipDestination>12</relationshipDestination>
</relationship>
<relationship ID="Rel3" type="GRelation">
   <relationshipSource>02</relationshipSource>
   <relationshipDestination>13</relationshipDestination>
</relationship>
<relationship ID="Rel4" type="GRelation">
   <relationshipSource>11</relationshipSource>
   <relationshipDestination>21</relationshipDestination>
</relationship>
<relationship ID="Rel5" type="GRelation">             ⎫
   <relationshipSource>11</relationshipSource>        ⎬ DELETE
   <relationshipDestination>22</relationshipDestination> ⎭
</relationship>
<relationship ID="Rel6" type="GRelation">
   <relationshipSource>12</relationshipSource>
   <relationshipDestination>23</relationshipDestination>
</relationship>
```

FIG. 31

```
                  Software CIs
<item ID="21" type="Software">
   <record type="observed">
      <Software softwareName="SOFT1" softwareID="001"/>
      <System/>
      <Server serverName="SV1"/>
   </record>
</item>
<item ID="22" type="Software">
   <record type="observed">
      <Software softwareName="SOFT2" softwareID="002"/>
   </record>
</item>
<item ID="23" type="Software">
   <record type="observed">
      <Software softwareName="SOFT3" softwareID="003"/>
      <System/>
      <Server serverName="SV2"/>
   </record>
</item>
<item ID="24" type="Software">
   <record type="observed">
      <Software softwareName="SOFTA" softwareID="004"/>
</record>
</item>
<item ID="25" type="Software">
   <record type="observed">
      <Software softwareName="SOFTB" softwareID="005"/>
   </record>
</item>
```

| ID | SYSTEM NAME | SYSTEM ID |
|----|-------------|-----------|
| 01 | SYS1 | S_1 |
| 02 | SYS2 | S_2 |
| 03 | SYS3 | S_3 |
| 04 | SYS4 | S_4 |

Tv

| ID | SERVER NAME | IP ADDRESS |
|----|-------------|------------|
| 11 | SV1 | 192.168.0.1 |
| 12 | SV2 | 192.168.0.2 |
| 13 | SV3 | 192.168.0.3 |
| 14 | SV4 | 192.168.1.1 |
| 15 | SV5 | 192.168.1.2 |

Tr

| RELATIONSHIP SOURCE | RELATIONSHIP DESTINATION |
|---------------------|--------------------------|
| 01 | 11 |
| 01 | 12 |
| 02 | 13 |
| 11 | 21 |
| 11 | 22 |
| 12 | 23 |

DELETE

Tf

| ID | SOFTWARE NAME | SOFTWARE ID |
|----|---------------|-------------|
| 21 | SOFT1 | 001 |
| 22 | SOFT2 | 002 |
| 23 | SOFT3 | 003 |
| 24 | SOFTA | 004 |
| 25 | SOFTB | 005 |

"SHORT RETRIEVAL KEY"

| SYSTEM | SERVER NAME |
|--------|-------------|
| (RELATED) | SV1 |
| (UNRELATED) | (UNRELATED) |
| (RELATED) | SV2 |
| (UNRELATED) | (UNRELATED) |
| (UNRELATED) | (UNRELATED) |

CONFIGURATION INFORMATION MANAGEMENT APPARATUS AND RETRIEVAL METHOD

CROSS-REFERENCE TO RELATED APPLICATION

This application is based upon and claims the benefit of priority of the prior Japanese Patent Application No. 2012-59709, filed on Mar. 16, 2012, the entire contents of which are incorporated herein by reference.

FIELD

The embodiments disclosed herein are related to a configuration information management apparatus, a retrieval method and a recording medium.

BACKGROUND

A configuration management database (CMDB) that stores configuration information relating to operation management of an Information Technology (IT) system in order to consolidate scattered data has been proposed recently. Hereafter, a configuration management database will be referred to as a CMDB.

A CMDB stores configuration items (CI) including configuration information (also known as attribute information) relating to servers and software of a management subject IT system, and relationship item information expressing relationships between the configuration items. Hereafter, a configuration item will be referred to as a CI and the relationship item information will be referred to as a Relationship. Further, an apparatus known as a federated configuration management database (FCMDB), which integrates various configuration information dispersed among a plurality of CMDBs has been proposed (see Japanese Laid-open Patent Publication No. 2011-134005). Hereafter, a federated configuration management database will be referred to as an FCMDB.

An IT system manager (to be referred to as a manager hereafter) can easily grasp an overall configuration of the IT system, such as hardware maintenance operations and software installation states, by checking the CIs. The manager instructs retrieval software to retrieve a CI to be checked, or in other words a retrieval subject CI, from among the CIs stored in the FCMDB. Upon reception of the retrieval instruction, the retrieval software retrieves the retrieval subject CI from the CIs stored in the FCMDB, and returns the retrieved CI to the manager as a retrieval result.

When a scale of a management subject IT system increases, the number of CIs stored in the FCMDB also increases such that relationships between the CIs extend over a plurality of stages. As a result, a CI retrieval processing time increases, leading to an increase in stress on the manager. It is therefore desirable to shorten the retrieval processing time.

SUMMARY

According to an aspect of the embodiments, a configuration information management apparatus includes: a database which stores each attribute information of a plurality of configuration items and relationship item information expressing relationships between the configuration items in a plurality of stages; and a control unit which, in response to an input of a relationship retrieval formula in which a plurality of configuration items are related by a retrieval condition, retrieves a retrieval subject configuration item from the database by tracing the relationship item information between the configuration items, wherein the control unit generates a retrieval formula pattern representing a pattern of a first relationship retrieval formula which has been input, executes retrieval processing on the retrieval formula pattern, measures a state required for the retrieval processing which has been executed, determines whether or not the state satisfies a first condition, and when the first condition is satisfied, stores the retrieval condition relating to the retrieval subject configuration item in the retrieval formula pattern satisfying the first condition in the database as a short retrieval key, and retrieves, when a second relationship retrieval formula is input and a retrieval formula pattern of the second relationship retrieval formula satisfies a second condition, the retrieval subject configuration item in the second relationship retrieval formula, on the basis of the short retrieval key.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view illustrating CIs and Relationships described in an extensible markup language (XML) format;

FIG. 5 is a view illustrating examples of system CIs and server CIs in the management subject of FIG. 2, described in the XML format;

FIG. 6 is a view illustrating examples of software CIs and Relationships in the management subject of FIG. 2, described in the XML format;

FIG. 7 is a block diagram illustrating a hardware configuration of a retrieval system 1 according to this embodiment;

FIG. 10 is a view illustrating a retrieval formula pattern storage table in an updated state;

FIG. 11 is a view illustrating a state in which updating processing is performed repeatedly on the retrieval formula pattern storage table;

FIG. 14 is a view illustrating software CIs in which the short retrieval key has been embedded;

FIG. 15 is a view illustrating another method of embedding the short retrieval key illustrated in FIG. 14;

FIG. 17 is a view illustrating CIs and Relationships corresponding to FIG. 5 and FIG. 6 in a table format, according to another embodiment;

FIG. 18 is a view illustrating a state in which the short retrieval key has been embedded in a software CI in the table format of FIG. 17;

FIG. 22 is a view illustrating CIs including modified attribute information;

FIG. 23 is a view illustrating CIs in which the attribute information has been replaced by updated attribute information;

FIG. 24 is a view illustrating CIs and Relationships in which the attribute information and the short retrieval key have been updated in a table format;

FIG. 26 is a view illustrating a newly created Relationship;

FIG. 27 is a view illustrating software CIs in which the short retrieval key has been embedded;

FIG. 28 is a view illustrating CIs and Relationships in which the Relationships have been updated, corresponding to FIG. 26 and FIG. 27, in a table format;

FIG. 30 is a view illustrating a newly created Relationship;

FIG. 31 is a view illustrating software CIs from which the short retrieval key has been deleted;

FIG. 32 is a view illustrating CIs and Relationships from which a Relationship has been deleted, corresponding to FIG. 30 and FIG. 31, in a table format;

DESCRIPTION OF EMBODIMENTS

Retrieval System

Figure 1:
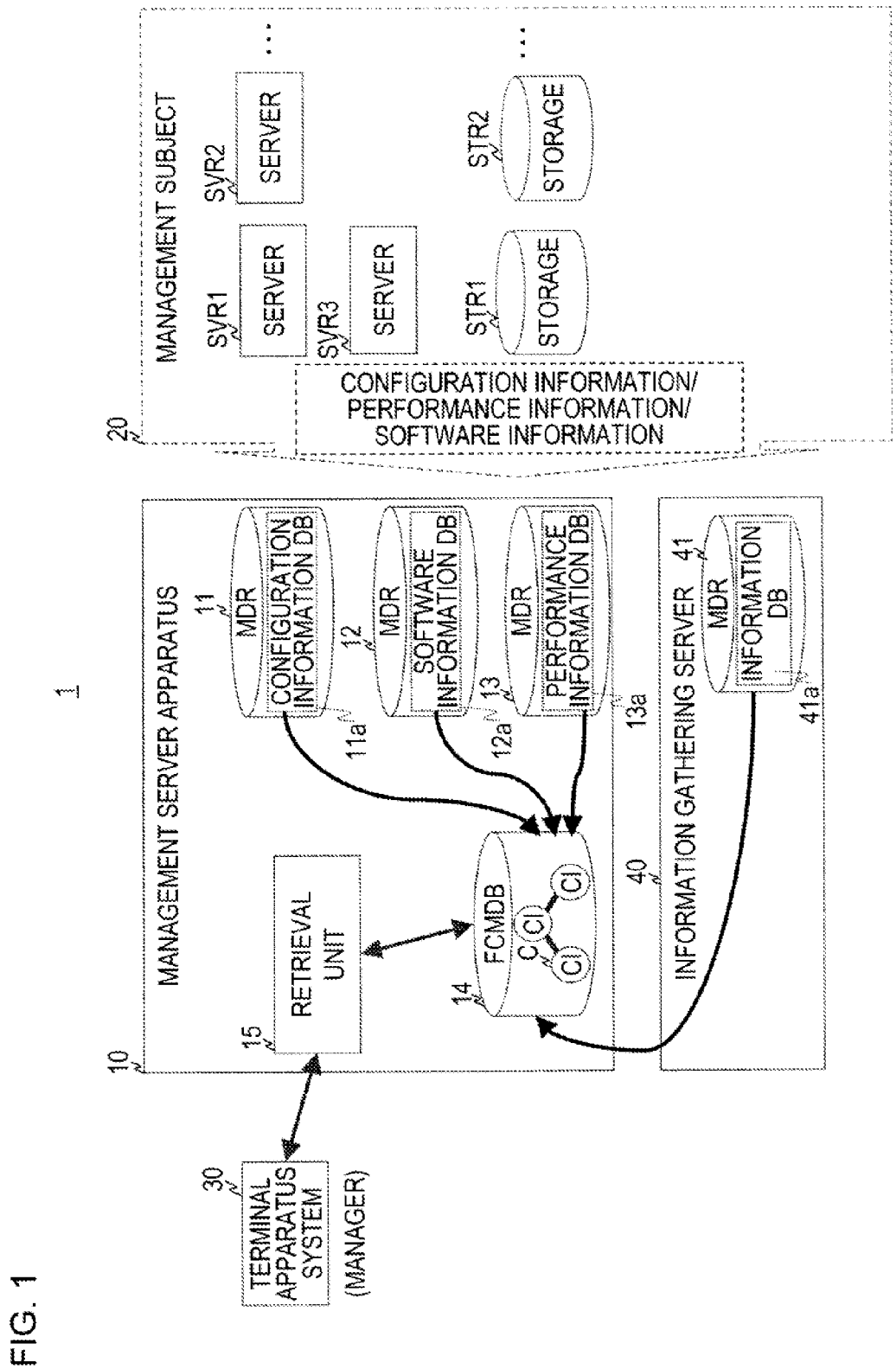
FIG. 1 is a block diagram illustrating hardware of a retrieval system according to an embodiment.

FIG. 1 is a block diagram illustrating hardware of a retrieval system 1 according to an embodiment. A management server apparatus 10 of the retrieval system 1 manages servers, storage apparatuses (to be referred to hereafter as storages), and software of a management subject 20.

The management server apparatus 10 and the management subject 20 are connected via a network (not illustrated).

First, the management server apparatus 10 will be described. A first management data repository (to be referred to as MDR hereafter) 11 gathers together configuration information (attribute information) of servers SVR1 to SVR3 and storages STR1, STR2 constituting the management subject 20, and stores the gathered configuration information in a configuration information database (configuration information DB) 11a. Hereafter, databases will be referred to as DB where appropriate.

The first MDR 11 converts the configuration information stored in the configuration information DB 11a into CIs and stores the CIs in an FCMDB 14. Note that an FCMDB is a federated configuration management database (Federated CMDB).

Here, the configuration information includes, for example, an identifier (ID), an IP address, and so on of the servers SVR1 to SVR3 and the storages STR1, STR2.

A second MDR 12 gathers together information (software information) relating to software (see FIG. 2) constituting the management subject 20, and stores the gathered information in a software information DB 12a. The second MDR 12 converts the software information stored in the software information DB 12a into CIs and stores the CIs in the FCMDB 14. Note that the software may also be referred to as applications.

A third MDR 13 gathers together performance information relating to the servers SVR1 to SVR3 and the storages STR1, STR2 constituting the management subject 20, and stores the gathered performance information in a performance information DB 13a. The third MDR 13 converts the performance information stored in the performance information DB 13a into CIs and stores the CIs in the FCMDB 14. Here, the performance information indicates performances of central processing units (CPU) of the servers SVR1 to SVR3, storage capacities of the storages STR1, STR2, and so on, for example.

The FCMDB 14 stores the CIs from the first MDR 11, the second MDR 12, and the third MDR 13 in a database and manages the stored CIs. A reference symbol C in the FCMDB 14 indicates a CI.

A retrieval unit 15, upon reception of a CI retrieval instruction from a terminal apparatus system 30, executes processing to retrieve a retrieval subject CI from the CIs stored in the FCMDB 14 and return a CI retrieval result to the terminal apparatus system 30. This retrieval processing will be described in detail using FIG. 2 and FIG. 3.

Note that the first MDR 11, the second MDR 12, and the third MDR 13 may be provided separately in the form of an integrated information gathering server apparatus 40 instead of being provided in the management server apparatus 10. An MDR 41 of the information gathering server apparatus 40 is an MDR formed by integrating the first MDR 11, the second MDR 12, and the third MDR 13, which gathers together the various information relating to the management subject 20 and stores the gathered information in an information DB 41a.

The management server apparatus 10, management subject 20, and information gathering server apparatus 40 described above are disposed in a data center of a business enterprise, for example.

(Management Server Apparatus, Management Subject)

Figure 2:
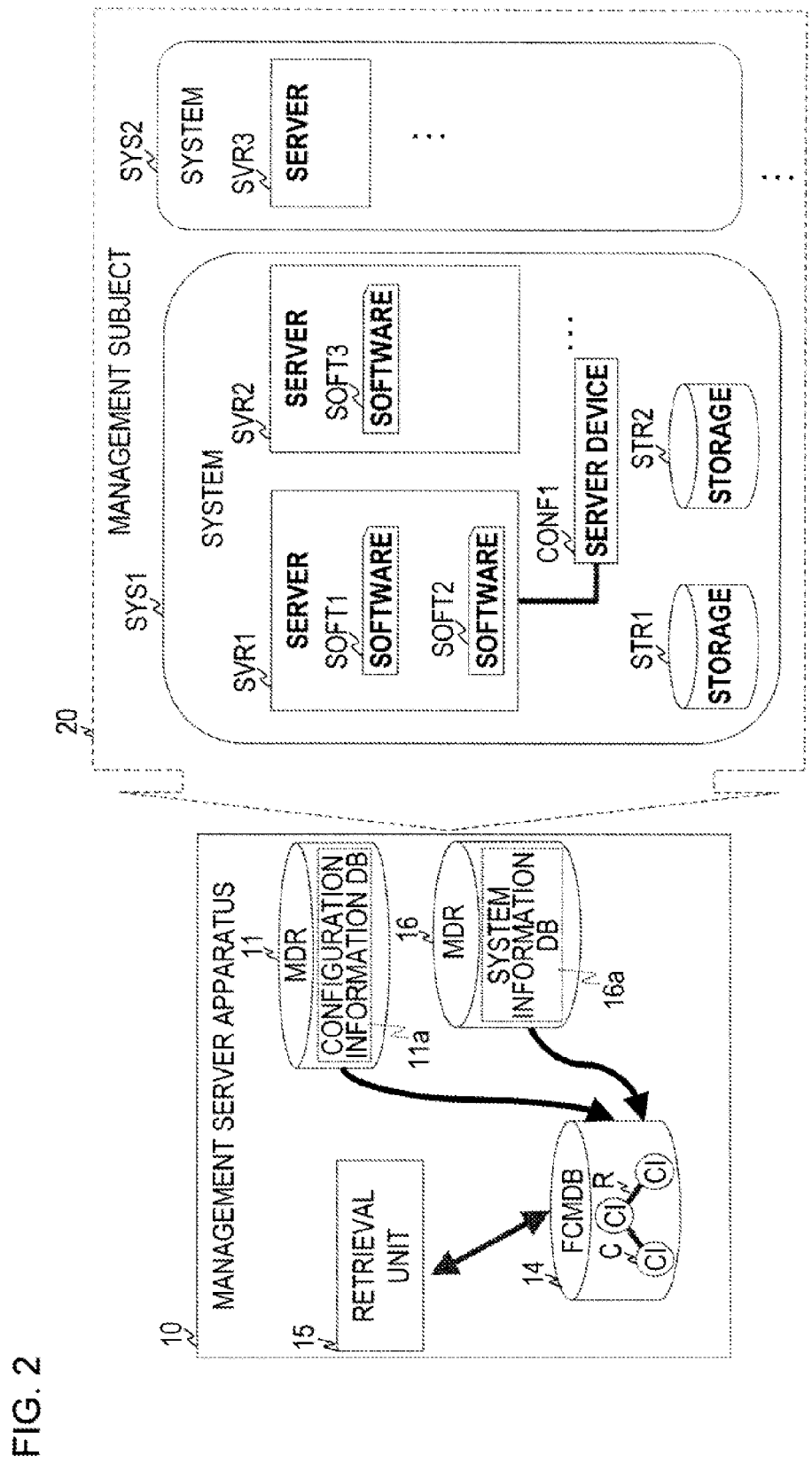
FIG. 2 is a block diagram illustrating hardware of management server apparatus and a management subject of FIG. 1.

FIG. 2 is a block diagram illustrating hardware of the management server apparatus 10 and the management subject 20 of FIG. 1. Note that in the following description, blocks having identical functions to FIG. 1 have been allocated identical reference symbols.

A basic configuration of the management server apparatus 10 is similar to the configuration described using FIG. 1. However, a fourth MDR 16 is provided to illustrate the CI retrieval processing. Further, illustration of the second MDR 12, third MDR 13, and information gathering server apparatus 40 of FIG. 1 is not needed to describe the retrieval processing, and has therefore been omitted.

A system SYS1 and a system SYS2 of the management subject 20 are various types of business systems, for example accounting systems, development systems, or the like.

In this embodiment, a server SVR1, a server SVR2, a storage STR1, and a storage STR2 are provided in the system SYS1. Note that in the system SYS1, the server SVR1, the server SVR2, the storage STR1, and the storage STR2 are connected to each other via a network. Software SOFT1 and software SOFT2 are installed in the server SVR1. Further, a server device CONF1 is externally connected to the server SVR1. The server device CONF1 is an external hard disk drive, for example. Software SOFT3 is installed in the server SVR2.

A server SVR3 is provided in the system SYS2. It is assumed that no management subject software is installed in the server SVR3.

Note that the management subject 20 includes other systems, servers, software, storages, and so on, which are not illustrated in the drawings.

The first MDR11 gathers together configuration information relating to the servers SVR1 to SVR3, the server device CONF1, the storage STR1, the storage STR2, the software SOFT1 to SOFT3, and so on of the management subject 20, and stores the gathered configuration information in the configuration information DB 11a. The first MDR11 converts the configuration information stored in the configuration information DB 11a into a CI format, and stores the resulting CI(s) (the converting CI(s)) in the FCMDB 14. Note that the CIs will be described in detail using FIG. 4 to FIG. 6.

Here, the configuration information of the servers includes a server name and an IP address, for example. Further, the configuration information of the software includes a software name and an identification symbol, for example.

The first MDR 11 also gathers together relationship information indicating mutual relationships between the servers SVR1 to SVR3, the server device CONF1, the storage STR1, the storage STR2, the software SOFT1 to SOFT3, and so on of the management subject 20, converts the gathered information into Relationships, and stores the Relationships in the FCMDB 14. In the example of FIG. 2, the relationship information is information indicating that the software SOFT1, SOFT2 is installed in the server SVR1 and the server device CONF1 is externally connected to the server SVR1, for example. The Relationships are information indicating relationships between the CIs. Note that the Relationship will be described in detail using FIG. 4 to FIG. 6.

The fourth MDR 16 gathers together system information relating to the systems SYS1, SYS2 of the management subject 20 and stores the gathered system information in a system information DB 16a. The system information includes system names and system identification symbols, for example. The fourth MDR 16 converts the system information stored in the system information DB 16a into the CI format, and stores the resulting CIs in the FCMDB 14. Further, the fourth MDR 16 gathers together relationship information indicating mutual relationships between the systems SYS1, SYS2 and the servers SVR1 to SVR3 of the management subject 20, converts the gathered information into Relationships, and stores the Relationships in the FCMDB 14. In the example of FIG. 2, the relationship information is information indicating that the server SVR1, the server SVR2, the storage STR1, the storage STR2, and so on are provided in the system SYS1, for example.

A reference symbol C and a reference symbol R in the FCMDB 14 respectively indicate CIs and Relationships stored in the FCMDB 14.

(Configuration of Management Subject)

Figure 3:
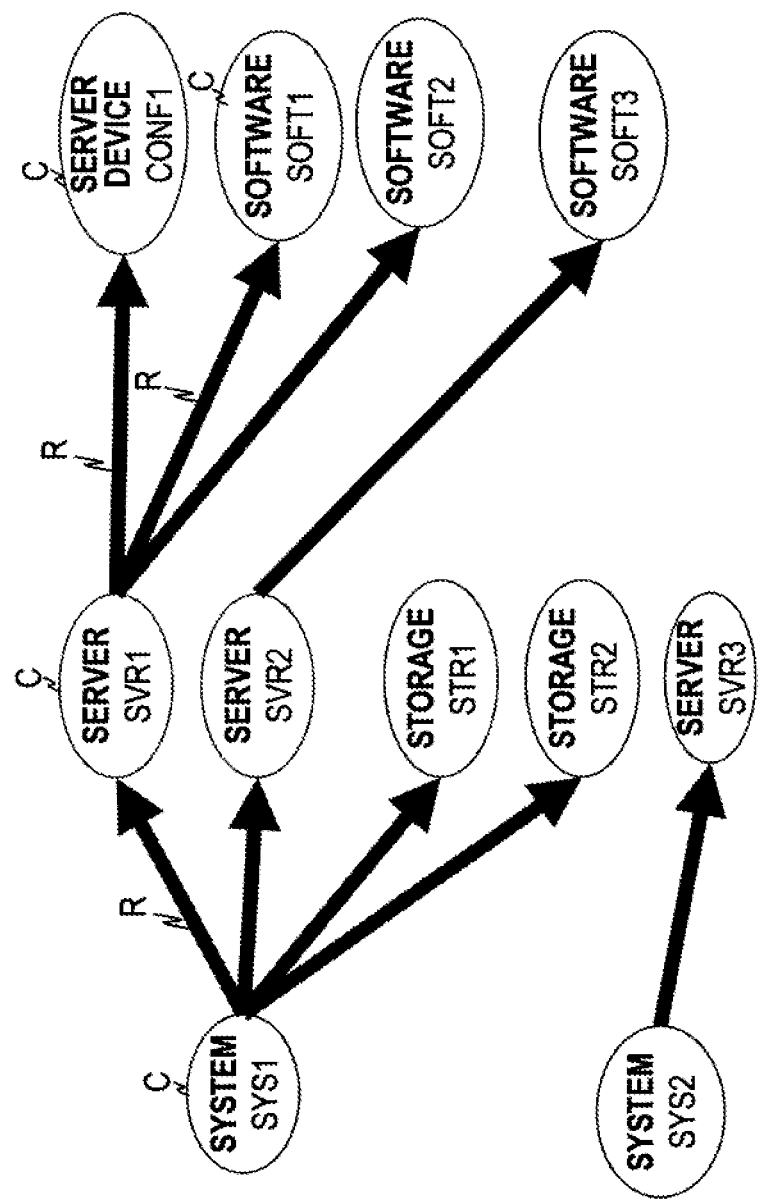
FIG. 3 is a pattern diagram illustrating relationships between systems, servers, and software of a management apparatus in the configuration example of FIG. 2.

FIG. 3 is a pattern diagram illustrating relationships between the systems, servers and software of the management subject 20 according to the configuration example of FIG. 2. In FIG. 3, oval shapes (see reference symbol C) schematically represent CIs, and arrows (see reference symbol R) schematically represent Relationships.

For example, in a configuration of the system SYS1, the CI of the system SYS1 is related to the CI of the server SVR1, the CI of the server SVR2, the CI of the storage STR1, and the CI of the storage STR2 by Relationships. Further, the CI of the server SVR1 is related to the server device CONF1, the software SOFT1, and the software SOFT2. Moreover, the server SVR2 is related to the software SOFT3.

By specifying relationships among the CIs using Relationships in this manner, it is possible to know the systems to which the servers belong and the software installed in the servers.

(CIs, Relationships, and Relationship Retrieval)

The CIs and Relationships stored in the FCMDB 14, illustrated in FIG. 2 and FIG. 3, will now be described on the basis of FIG. 4.

FIG. 4 is a view illustrating CIs and Relationships described in an extensible markup language (XML) format. The CIs are divided into a system CI, a server CI, and a software CI.

Content described between a tag <item ID="01x" type="System"> and a tag </item> of the system CI is information included in a single system CI. The tag <item ID="01x" type="System"> indicates that an identification symbol item ID of the CI is "01x" and that the CI is a system CI.

A tag <record type="observed"> indicates a recording format of the CI.

A tag <System systemName="PSYSx" systemID="S_x"/> indicates that the name of the system is "SYSx" and the identification symbol ID thereof is "S_x". The configuration information of the system CI is the system name and the identification symbol serving as the content of this tag, for example. Here, the configuration information will be referred to where appropriate as attribute information.

Content described between a tag <item ID="11x" type="Server"> and a tag </item> of the server CI is information included in a single server CI. The tag <item ID="11x" type="Server"> of the server CI indicates that the identification symbol item ID of the CI is "11x" and that the CI is a server CI.

A tag <Server serverName="SVx" IPaddress="192. 168. 0. x"/> indicates that the server name is "SVx" and the IP address allocated to the server is "192. 168. 0. x". The attribute information of the server CI is the content of this tag, i.e. the server name and the IP address, for example.

Content described between a tag <item ID="21x" type="Software"> and a tag </item> of the software CI is information included in a single software CI. The tag <item ID="21x" type="Software"> indicates that the identification symbol item ID of the software CI is "21x" and that the CI is a software CI.

A tag <Software softwareName="SOFTx" softwareID="00x"/> indicates that the name of the software is "SOFTx" and the identification symbol ID thereof is "00x". The attribute information of the software CI is the content of this tag, i.e. the software name and the identification symbol, for example.

Next, the Relationship will be described. Content described between a tag <relationship ID="Relx" type="GRelation"> and a tag </relationship> of the Relationship is information included in a single Relationship.

The tag <relationship ID="Relx" type="GRelation"> of the Relationship indicates that an identification symbol relationship ID of the Relationship is "Relx".

A tag <relationshipSource>01x</relationshipSource> indicates that a CI serving as a relationship source is a CI represented by an identification symbol "01x".

A tag <relationshipDestination>11x</relationshipDestination> indicates that a CI related to the relationship source CI is a CI represented by an identification symbol "11x". The relationship source CI and the relationship destination CI will also be referred to as a master CI and a slave CI, respectively.

It is evident from the CIs and the Relationships depicted in FIG. 4 that the CI related to the system CI (where the ID of the relationship source is 01x indicating the system CI) is the server CI (where the ID of the relationship destination is 11x indicating the server CI). It is also evident that the CI related to the server CI (where the ID of the relationship source is 11x indicating the server CI) is the software CI (where the ID of the relationship destination is 21x indicating the software CI).

Note that here, the fact that the server CI is related to the system CI means that the server represented by the server CI belongs to the system represented by the system CI. Further, the fact that the software CI is related to the server CI means that the software represented by the software CI is installed in the server represented by the server CI.

The CIs and Relationships of the management subject 20 described in the configuration example of FIG. 3 will now be described on the basis of FIG. 5 and FIG. 6.

FIG. 5 is a view illustrating examples of a part of the system CIs and server CIs in the management subject 20 of FIG. 2, described in the XML format, for example. In FIG. 5, for example, CIs corresponding to system names SYS1 to SYS4 are stored in the system CIs, and CIs corresponding to server names SV1 to SV5 are stored in the server CIs.

The system CIs and server CIs are stored in the FCMDB 14 (see reference symbol C) in FIG. 2 in a file format.

FIG. 6 is a view illustrating examples of the software CIs and Relationships in the management subject 20 of FIG. 2, described in the XML format, for example. In FIG. 6, for example, CIs corresponding to software names SOFT1 to SOFT3, SOFTA, and SOFTB are stored in the software CIs. Further, relationships between the system CIs and server CIs illustrated in FIG. 5 and the software CIs illustrated in FIG. 6 are stored in the Relationships.

The software CIs are stored in the FCMDB 14 (see reference symbol C) in FIG. 2 in a file format. Likewise, the Relationships are stored in the FCMDB 14 (see reference symbol R) in FIG. 2 in a file format.

It is evident from an identification symbol Rel1 in the Relationships of FIG. 6 that, for example, a CI (see system CIs in FIG. 5) having a relationship source identification symbol ID 01 and a CI (see server CI in FIG. 5) having a relationship destination identification symbol ID 11 are related.

Note that the software having the software name="SOFTA" described in the CI having a tag <item ID="24" type="Software"> and the software having the software name="SOFTB" described in the CI having a tag <item ID="25" type="Software"> among the software CIs illustrated in FIG. 6 are software not belonging to any system and not installed in any server.

By describing the CIs in the XML format, a developer or a manager can create a markup language having unique semantics and a unique structure while using a unified description method. As a result, a short retrieval key to be described below can be added easily.

CI retrieval processing will now be described with reference to FIGS. 3, 5, and 6. In the CI retrieval processing, a target CI is retrieved by tracing a relationship between a master CI (on a left side in FIG. 3) and a slave CI (on a right side in FIG. 3). Retrieving a retrieval subject CI by tracing the relationship between the CIs in this manner will be referred to as relationship retrieval.

A case in which the manager performs relationship retrieval in relation to software installed in the server SVR1, which is related to a certain system, for the purpose of software asset management or license management, for example, is envisaged.

In this case, the manager issues a relationship retrieval instruction to the retrieval unit 15 in FIG. 1 and FIG. 2. The retrieval unit 15 executes relationship retrieval in response to the relationship retrieval instruction. The retrieval unit 15 retrieves the system SYS1 from among the (four) system CIs illustrated in FIG. 5. The retrieval unit 15 traces the Relationships of the system SYS1, and retrieves the CI having the server name SVR1 from among the (two) server CIs related to the system SYS1. The retrieval unit 15 then traces the Relationships of the retrieved server CI, and retrieves the software SOFT1 and the software SOFT2 related to the server SVR1.

When relationship retrieval is executed by tracing the relationships between the CIs in this manner, retrieval has to be executed on a large number of CIs, and therefore a retrieval processing time increases.

Particularly in a case where the relationships between the CIs extend over a plurality of stages such that a large number of CI branches exist, the retrieval processing time increases dramatically when the retrieval subject is a terminal end CI. Hence, the retrieval processing time is shortened.

First Embodiment

FIG. 7 is a block diagram illustrating a hardware configuration of the retrieval system 1 according to this embodiment. The management server apparatus 10 includes a central processing unit (CPU) 121 that controls the entire management server apparatus 10, a memory 122, and a hard disk drive (to be referred to as an HDD hereafter) 123. Further, the management server apparatus 10 includes a network interface card (to be referred to hereafter as an NIC) 124 that is connected to a terminal apparatus system 30 via a network, the first MDR 11, the fourth MDR 16, and an FCMDB management apparatus 200. The FCMDB management apparatus will also be referred to as a configuration information management apparatus.

Figure 8:
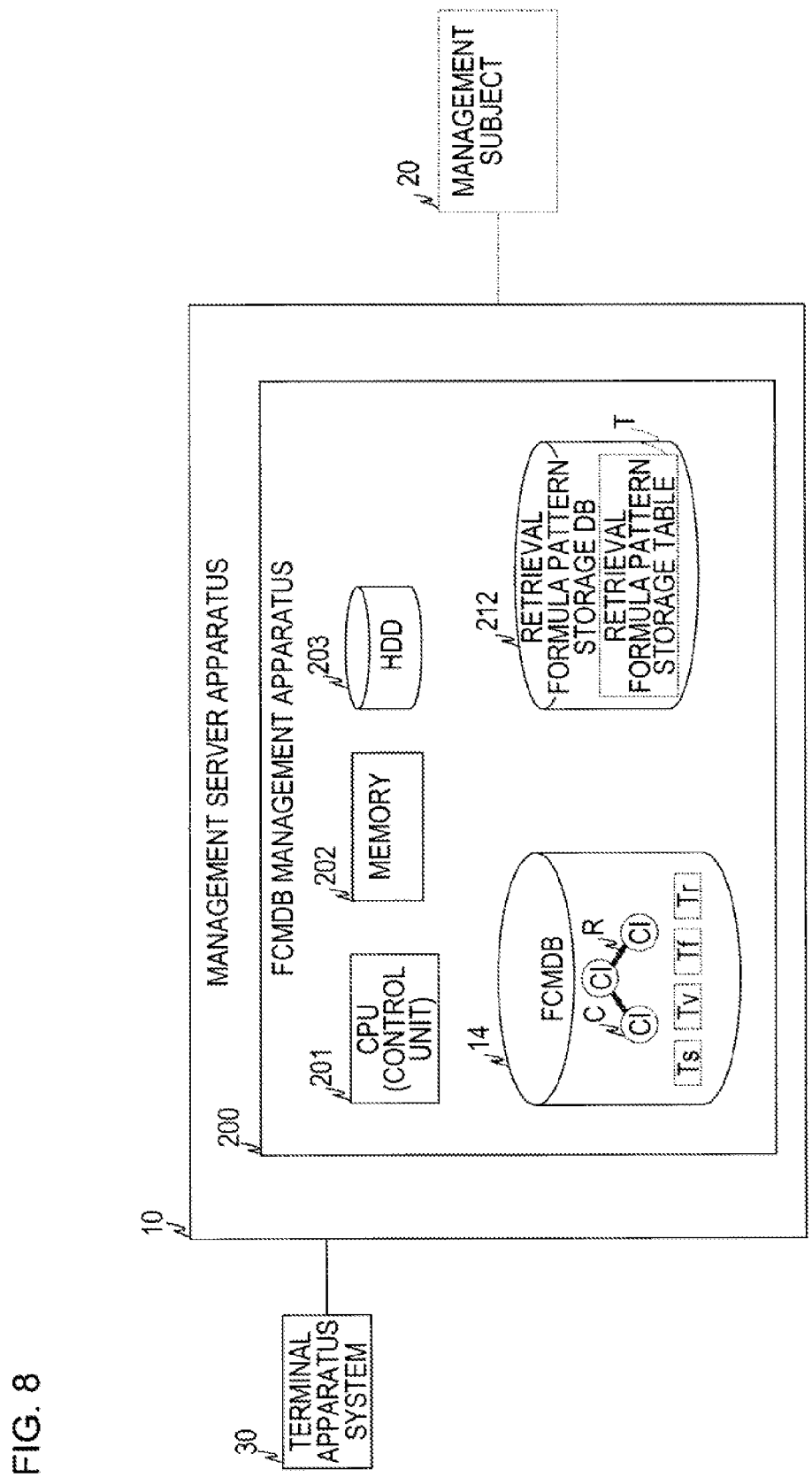
FIG. 8 is a block diagram illustrating a hardware configuration of an FCMDB management apparatus of FIG. 7.

FIG. 8 is a block diagram illustrating a hardware configuration of the FCMDB management apparatus 200 of FIG. 7.

The FCMDB management apparatus 200 includes a CPU (a control unit) 201 that functions as a computer for controlling the entire FCMDB management apparatus 200, a memory 202, an HDD 203, the FCMDB 14, and a retrieval formula pattern storage DB 212. The FCMDB 14 is a database storing CI attribute information (also referred to as configuration information) and Relationships indicating relationships between the CIs in a plurality of stages.

Figure 9:
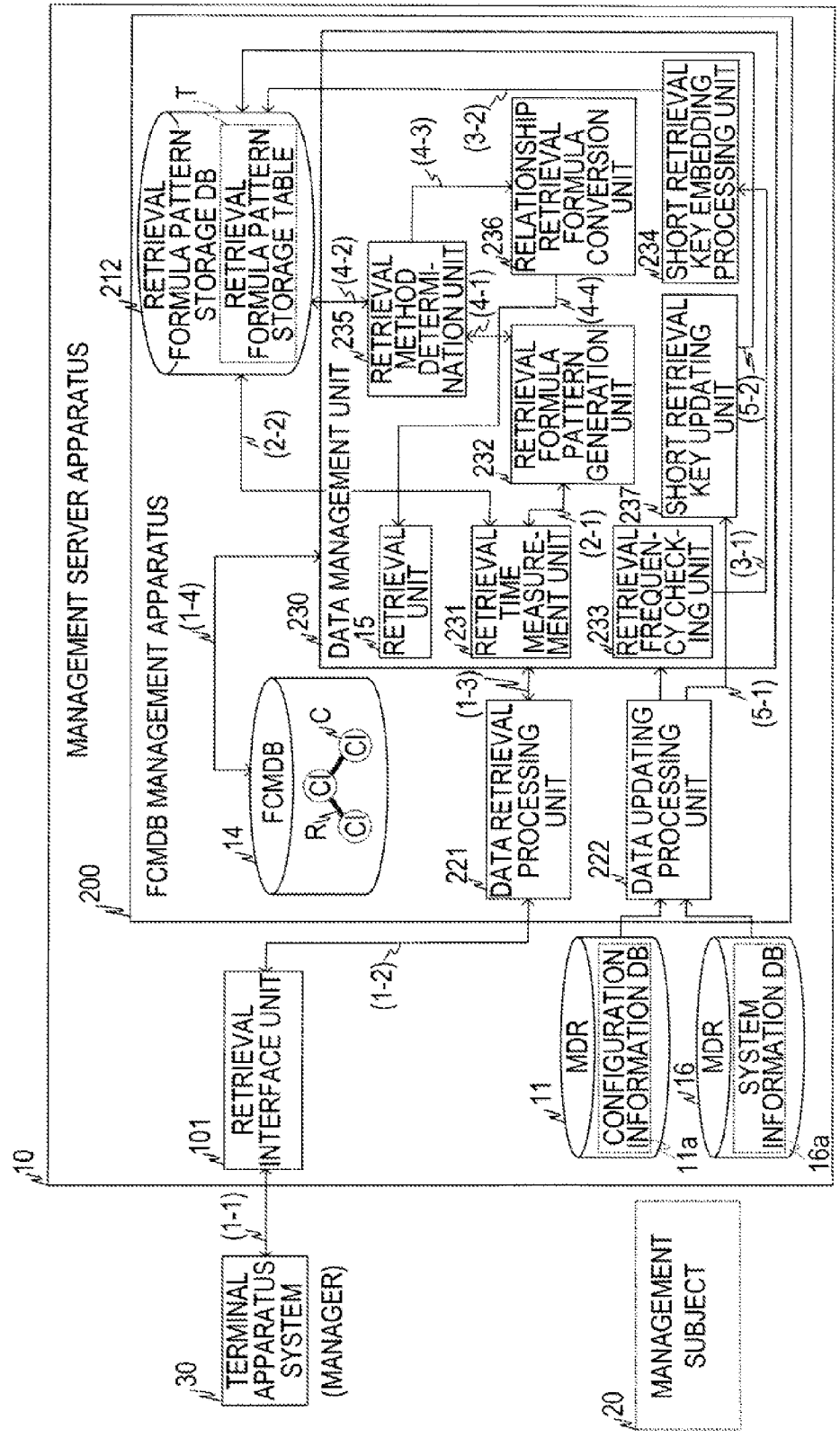
FIG. 9 is a block diagram of software modules, illustrating in detail operations of a server apparatus of FIG. 7 and the FCMDB apparatus of FIG. 8.

FIG. 9 is a block diagram of software modules, illustrating in detail operations of the server apparatus 10 in FIG. 7 and the FCMDB management apparatus 200 in FIG. 8.

First, a relationship between the server apparatus 10 of FIG. 7 and a server apparatus 10 of FIG. 9 will be described.

A retrieval interface unit 101 in FIG. 9 is a software module. A program functioning as the retrieval interface unit 101 is recorded in the HDD 123 of FIG. 7. When the management server apparatus 10 is activated, the CPU 121 of FIG. 7 reads the program from the HDD 123 and expands the program in the memory 122 so as to function as the retrieval interface unit 101.

Next, a relationship between the FCMDB management apparatus 200 of FIG. 8 and the FCMDB management apparatus 200 of FIG. 9 will be described.

A data retrieval processing unit 221, a data updating processing unit 222, and a data management unit 230 in FIG. 9 are software modules. Note that the retrieval unit 15, a retrieval time measurement unit 231, a retrieval formula pattern generation unit 232, a retrieval frequency checking unit 233, a short retrieval key embedding processing unit 234, a retrieval method determination unit 235, a relationship retrieval formula conversion unit 236, and a short retrieval key updating unit 237 of the data management unit 230 are also software modules.

A program functioning as the data retrieval processing unit 221, the data updating processing unit 222, and the data management unit 230 of FIG. 9 is recorded in the HDD 203 of FIG. 8. When the FCMDB management apparatus 200 is activated, the CPU 201 of FIG. 8 reads the program from the HDD 203 and expands the program in the memory 202 so as to function as the data retrieval processing unit 221, the data updating processing unit 222, and the data management unit 230. The HDD 203 is an example of a computer-readable, non-transitory medium on which a program that causes a computer to execute digital signal processing is recorded. Alternatively, the program functioning as the data retrieval processing unit 221, the data updating processing unit 222, and the data management unit 230 of FIG. 9 may be recorded on a transportable recording medium such as a compact disc read only memory (CD-ROM), a digital versatile disc (DVD), or a universal serial bus (USB) memory. When the program is recorded on a transportable recording medium, the FCMDB management apparatus 200 includes a reading apparatus that reads the program recorded on the transportable recording medium.

Note that reference symbols Ts, Tv, Tf, Tr in the FCMDB 14 of FIG. 8 respectively represent a system CI table Ts, a server CI table Tv, a software CI table Tf, and a Relationship table Tr illustrated in FIG. 17.

Next, the management server apparatus 10 of FIG. 9 will be described. The retrieval interface unit 101 of the management server apparatus 10 receives a relationship retrieval formula input from the terminal apparatus system 30, and outputs the received relationship retrieval formula to the data retrieval processing unit 221 of the FCMDB management apparatus 200. Further, the retrieval interface unit 101 outputs a retrieval result input from the data retrieval processing unit 221 to the terminal apparatus system 30.

The first MDR 11 gathers together the attribute information of, for example, the servers SVR1 to SVR3, the server device CONF1, the storage STR1, the storage STR2, and the software SOFT1 to SOFT3 of the management subject 20 and stores the gathered attribute information in the configuration information DB 11a. The first MDR 11 converts the attribute information stored in the configuration information DB 11a into CIs and outputs the CIs to the data updating processing unit 222. Further, the first MDR 11 gathers together the relationship information of, for example, the servers SVR1 to SVR3, the server device CONF1, the storage STR1, the storage STR2, and the software SOFT1 to SOFT3, for example, converts the relationship information into Relationships, and outputs the Relationships to the data updating processing unit 222. Examples of the CIs include the server CIs in FIG. 5 and the software CIs in FIG. 6. Examples of the Relationships include the Relationships in FIG. 6.

The data updating processing unit 222 stores the input CIs and Relationships in the FCMDB 14 via the data management unit 230.

The fourth MDR 16 gathers together the system information of the systems SYS1, SYS2 of the management subject 20, for example, and stores the gathered system information in the system information DB 16a. The fourth MDR 16 converts the system information stored in the system information DB 16a into the CI format and outputs the resulting CIs to the data updating processing unit 222. Further, the fourth MDR 16 gathers together the relationship information of the systems SYS1, SYS2 and the servers SVR1 to SVR3, for example, converts the relationship information into Relationships, and outputs the Relationships to the data updating processing unit 222. Examples of the CIs include the system CIs and server CIs in FIG. 5. Examples of the Relationships include the Relationships in FIG. 6.

The data updating processing unit 222 stores the input CIs and Relationships in the FCMDB 14 via the data management unit 230.

Next, the FCMDB management apparatus 200 will be described. The FCMDB 14 of the FCMDB management apparatus 200 stores the input CIs and Relationships in a database and manages the input CIs and Relationships.

The retrieval formula pattern storage DB 212 is another database storing the retrieval formula pattern storage table T illustrated in FIG. 10.

The data retrieval processing unit 221 is an interface used during the CI retrieval processing.

The data updating processing unit 222 stores the CIs and Relationships input from the first MDR 11 and the fourth MDR 16 in the FCMDB 14 via the data management unit 230.

The data management unit 230 executes relationship retrieval processing and retrieval processing based on the short retrieval key to be described in this embodiment.

The data retrieval processing unit 221, the data updating processing unit 222, and the data management unit 230 are software modules.

The retrieval unit 15 of the data management unit 230 retrieves a retrieval subject CI from the CIs stored in the FCMDB 14. The retrieval time measurement unit 231 measures the retrieval processing time of the relationship retrieval formula. The retrieval formula pattern generation unit 232 generates a retrieval formula pattern by deleting the attribute information from an input relationship retrieval formula. The retrieval frequency checking unit 233 constantly checks a numerical value in a Frequency section of the retrieval formula pattern storage table T illustrated in FIG. 11 to check (determine) whether or not the numerical value in the Frequency section equals or exceeds a predetermined frequency.

The short retrieval key embedding processing unit 234 executes processing to embed the short retrieval key into the CI(s) stored in the FCMDB 14. The retrieval method determination unit 235 determines whether or not a retrieval formula pattern exists in the retrieval formula pattern storage table T stored in the retrieval formula pattern storage DB 212. The relationship retrieval formula conversion unit 236 converts a retrieval subject CI in the input relationship retrieval formula into a retrieval formula enabling direct retrieval. When the content of the CIs and Relationships stored in the FCMDB 14 is updated, the short retrieval key updating unit 237 updates the content of the short retrieval key relating to the update.

(Relationship Retrieval)

First, referring to FIG. 9, relationship retrieval will be described. The manager issues a relationship retrieval instruction by operating the terminal apparatus system 30. The terminal apparatus system 30 converts the relationship retrieval instruction into a relationship retrieval formula. The relationship retrieval formula is a retrieval formula defining both the retrieval subject CI and a retrieval condition relating to the retrieval subject CI. For example, the relationship retrieval formula takes the form of "/first retrieval condition/RLS/second retrieval condition [@]/RLS/retrieval subject CI".

"/" represents a break between a retrieval condition and an RLS. "/RLS/" indicates that the two retrieval conditions on the left and the right thereof are related by a Relationship. "[@]" in "retrieval condition[@]" is a section defining attribute information further specifying (limiting) the retrieval condition. In other words, in this relationship retrieval formula, a plurality of CIs are related by the retrieval conditions.

An example in which relationship retrieval is performed on a software CI related to the server name SVR1, which is related to a certain system, will be illustrated as the relationship retrieval formula.

For example, this relationship retrieval formula is "/system/RLS/server[@serverName='SV1']/RLS/software".

This relationship retrieval formula is a retrieval formula described in Xpath (XML Path Language) expanded for the FCMDB.

In this case, the retrieval subject CI is the software CI and the retrieval conditions related to the retrieval subject CI are a server and a certain system. Further, the server name 'SV1' is defined as the attribute information further limiting the retrieval condition. Here, the attribute information further limiting the retrieval condition denotes the character string from "=" onward, defined by a retrieval condition reference symbol "[ ]" in the relationship retrieval formula.

Hereafter, the cited relationship retrieval formula will be referred to as a relationship retrieval formula RS1 (a first relationship retrieval formula).

The terminal apparatus system 30 outputs the relationship retrieval formula RS1 to the retrieval interface unit 101 of the management server apparatus 10 (arrow (1-1) in FIG. 9). The retrieval interface unit 101 outputs the relationship retrieval formula RS1 to the data retrieval processing unit 221 (arrow (1-2) in FIG. 9). In response to input of the relationship retrieval formula RS1, the data retrieval processing unit 221 outputs the relationship retrieval formula RS1 to the retrieval unit 15 of the data management unit 230 (arrow (1-3) in FIG. 9).

The retrieval unit 15 performs relationship retrieval in response to input of the relationship retrieval formula RS1 by referencing the CIs and Relationships stored in the FCMDB 14 (arrow (1-4) in FIG. 9). Here, as illustrated in FIG. 5 and FIG. 6, relationship retrieval is performed to retrieve the software CI related to the server CI having the server name SV1, which is related to a certain system CI.

In the example of FIG. 5 and FIG. 6, the software CIs of the software SOFT1, SOFT2 are retrieved. The retrieval unit 15 of FIG. 9 then outputs the retrieval result to the data retrieval processing unit 221 (arrow (1-3) in FIG. 9). In response to input of the retrieval result, the data retrieval processing unit 221 outputs the retrieval result to the retrieval interface unit 101 (arrow (1-2) in FIG. 9). In response to input of the retrieval result, the retrieval interface unit 101 outputs the retrieval result to the terminal apparatus system 30 (arrow (1-1) in FIG. 9).

(Retrieval Formula Pattern)

Before describing retrieval processing based on the short retrieval key according to this embodiment, processing for generating a retrieval formula pattern from an input relationship retrieval formula will be described on the basis of FIGS. 9, 10, and 11.

FIG. 10 is a view illustrating a retrieval formula pattern storage table T1 in an updated state.

FIG. 11 is a view illustrating a state in which updating processing is performed repeatedly on the retrieval formula pattern storage table T1.

The retrieval time measurement unit 231 of FIG. 9 measures a time from input of the relationship retrieval formula RS1 into the retrieval unit 15 of the data management unit 230 to output of the retrieval result of the relationship retrieval formula by the retrieval unit 15.

The retrieval time measurement unit 231 then determines whether or not the retrieval time equals or exceeds a predetermined time. In other words, the retrieval time measurement unit 231 determines whether or not a retrieval speed is lower than a predetermined threshold. Here, the predetermined time may be a time (10 seconds, for example) determined by the manager in advance, for example. Alternatively, an average time of a retrieval time needed in a case where relationship retrieval is not executed may be calculated, and a time obtained by adding a certain time (5 seconds, for example) to the average time may be set as the predetermined time. A case in which relationship retrieval is not executed denotes a case in which the retrieval subject CI is retrieved from the configuration information stored in the FCMDB 14 without tracing the relationship information between the CIs corresponding to the retrieval conditions in the relationship retrieval formula.

When the retrieval time equals or exceeds the predetermined time, the retrieval time measurement unit 231 instructs the retrieval formula pattern generation unit 232 to generate a retrieval formula pattern from the input relationship retrieval formula (arrow (2-1) in FIG. 9).

In response to this instruction, the retrieval formula pattern generation unit 232 generates a retrieval formula pattern representing a pattern of the input relationship retrieval formula. More specifically, the retrieval formula pattern generation unit 232 generates a retrieval formula pattern by deleting the attribute information from the input relationship retrieval formula, and outputs the generated pattern to the retrieval time measurement unit 231. In the case of the relationship retrieval formula RS1 "/system/RLS/server[@serverName='SV1']/RLS/software", for example, the attribute information in the relationship retrieval formula is 'SV1' within the retrieval condition "server[@serverName='SV1']". Furthermore, here, the unnecessary reference symbol "=" is deleted at the same time as the retrieval condition.

Hence, the retrieval formula pattern of the relationship retrieval formula RS1 is "/system/RLS/server[@serverName]/RLS/software".

As depicted in FIG. 10, the retrieval time measurement unit 231 updates the content stored in the retrieval formula pattern storage table T of the retrieval formula pattern storage DB 212 (arrow (2-2) in FIG. 9). The retrieval formula pattern storage table T1 in FIG. 10 is stored in the retrieval formula pattern storage DB 212 of FIG. 9 as the retrieval formula pattern storage table T.

The retrieval formula pattern storage table T1 includes a "Formula Pattern" section, a "Short Retrieval Key Embedding" section, and a "Frequency" section. The retrieval formula pattern is stored in the "Formula Pattern" section, and an embedding state of the short retrieval key is stored in the "Short Retrieval Key Embedding" section. A storage frequency of an identical retrieval formula pattern is stored in the "Frequency" section.

As depicted in FIG. 10, when the converted retrieval formula pattern does not exist in the "Formula Pattern" section, the retrieval time measurement unit 231 of FIG. 9 stores the converted retrieval formula pattern in the "Formula Pattern" section, and sets a numerical value in the "Frequency" section at 1.

When the converted retrieval formula pattern does exist in the "Formula Pattern" section, on the other hand, the retrieval time measurement unit 231 increases the numerical value in the "Frequency" section corresponding to the converted retrieval formula pattern by one. Note that in an initial state, "Not Yet" is stored in the "Short Retrieval Key Embedding" section to indicate that the short retrieval key is not embedded.

The retrieval formula pattern input, retrieval result response processing, retrieval time measurement processing, and retrieval formula pattern storage table updating processing described above are executed repeatedly.

For example, relationship retrieval formulae that differ from the relationship retrieval formula RS1 in that different server names are included as the attribute information of the retrieval condition are input. These relationship retrieval formulae are, for example, "/system/RLS/server[@serverName='SV2']/RLS/software" and "/system/RLS/server[@serverName='SV3']/RLS/software".

Alternatively, a relationship retrieval formula such as "/system[@systemName='SYS1']/RLS/server" is input. In this relationship retrieval formula, the server CI related to the CI of the system name SYS1 is set as the retrieval subject.

When the retrieval processing times for these relationship retrieval formulae equal or exceed the predetermine time, the retrieval time measurement unit 231 performs updating processing repeatedly on the retrieval formula pattern storage table T1 of FIG. 10. As a result, as illustrated by a retrieval formula pattern storage table T2 in FIG. 11, the frequency of the retrieval formula pattern "/system/RLS/server[@serverName]/RLS/software" of the relationship retrieval formula RS1 reaches a predetermined frequency (100 times). Hereafter, a retrieval formula pattern having the predetermined frequency or greater will be referred to as a retrieval formula pattern SP1. Note that although 100 times is cited as an example of the predetermined frequency, various other frequencies may be used.

The retrieval formula pattern "/system[@systemName]/RLS/server" illustrated in FIG. 11 is the retrieval formula pattern of the relationship retrieval formula "/system[@systemName='SYS1']/RLS/server", for example.

The retrieval formula pattern storage table T2 is stored in the retrieval formula pattern storage DB 212 of FIG. 9 as the retrieval formula pattern storage table T.

The retrieval frequency checking unit 233 of FIG. 9 constantly checks the numerical value in the Frequency section of the retrieval formula pattern storage table T to determine whether or not the numerical value in the Frequency section equals or exceeds the predetermined frequency.

When the numerical value in the Frequency section of the retrieval formula pattern storage table T equals or exceeds the predetermined frequency, the retrieval frequency checking unit 233 instructs the short retrieval key embedding processing unit 234 to embed the short retrieval key (arrow (3-1) in FIG. 9).

The retrieval frequency checking unit 233 determines in relation to the input relationship retrieval formula whether or not the measured retrieval processing time equals or exceeds the predetermined time and whether or not the frequency with which the retrieval formula pattern of this relationship retrieval formula has been stored in the retrieval formula pattern storage table T of the retrieval formula pattern storage DB 212 equals or exceeds the predetermined frequency. The retrieval frequency checking unit 233 then sets a retrieval formula pattern having the predetermined frequency or greater as a retrieval formula pattern satisfying a first condition.

In other words, the retrieval frequency checking unit 233 measures (checks) the storage frequency of the retrieval formula pattern in the retrieval formula pattern storage table T, for example, as a required state for executing retrieval processing on the generated retrieval formula pattern Here, the retrieval time of the retrieval subject CI in the retrieval formula pattern, measured by the retrieval time measurement unit 231, may also be included in the required state for executing retrieval processing on the generated retrieval formula pattern. As described above, when the retrieval time equals or exceeds the predetermined time, the retrieval time measurement unit 231 stores the retrieval formula pattern in the retrieval formula pattern storage table T.

When the state described above satisfies the first condition and, in the above example, the storage frequency of the retrieval formula pattern equals or exceeds the predetermined frequency, the retrieval frequency checking unit 233 determines that the retrieval formula pattern is a retrieval formula pattern satisfying the first condition.

(Short Retrieval Key Embedding)

The short retrieval key embedding processing will now be described on the basis of FIG. 9 and FIGS. 12 to 16.

Figure 12:
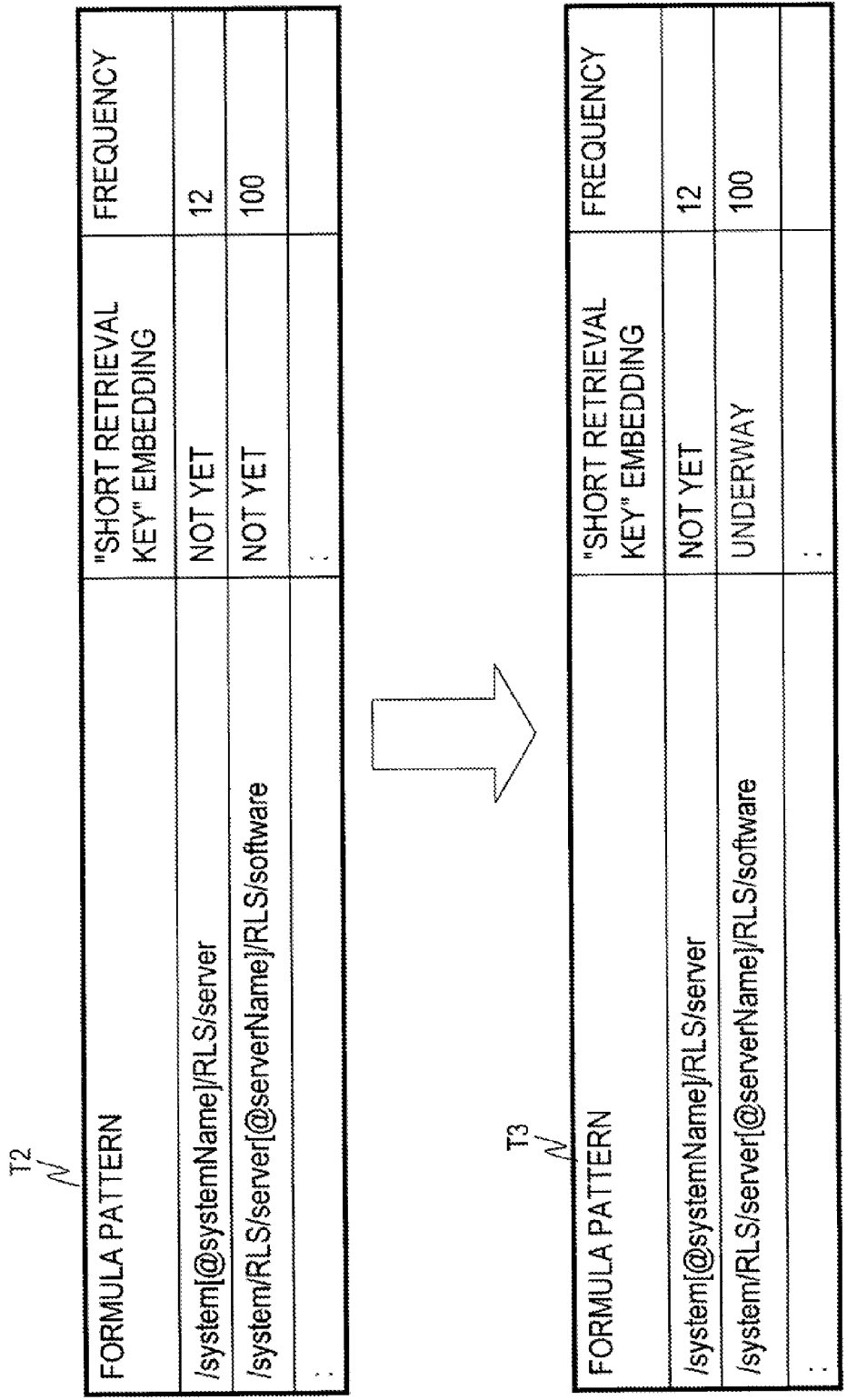
FIG. 12 is a view illustrating a retrieval formula pattern storage table in a state where a "Short Retrieval Key Embedding" section of the retrieval formula pattern storage table has been modified to "Underway"

FIG. 12 is a view illustrating a retrieval formula pattern storage table T3 in a state where the "Short Retrieval Key Embedding" section of the retrieval formula pattern storage table T2 in FIG. 11 has been modified to "Underway".

Figure 13:
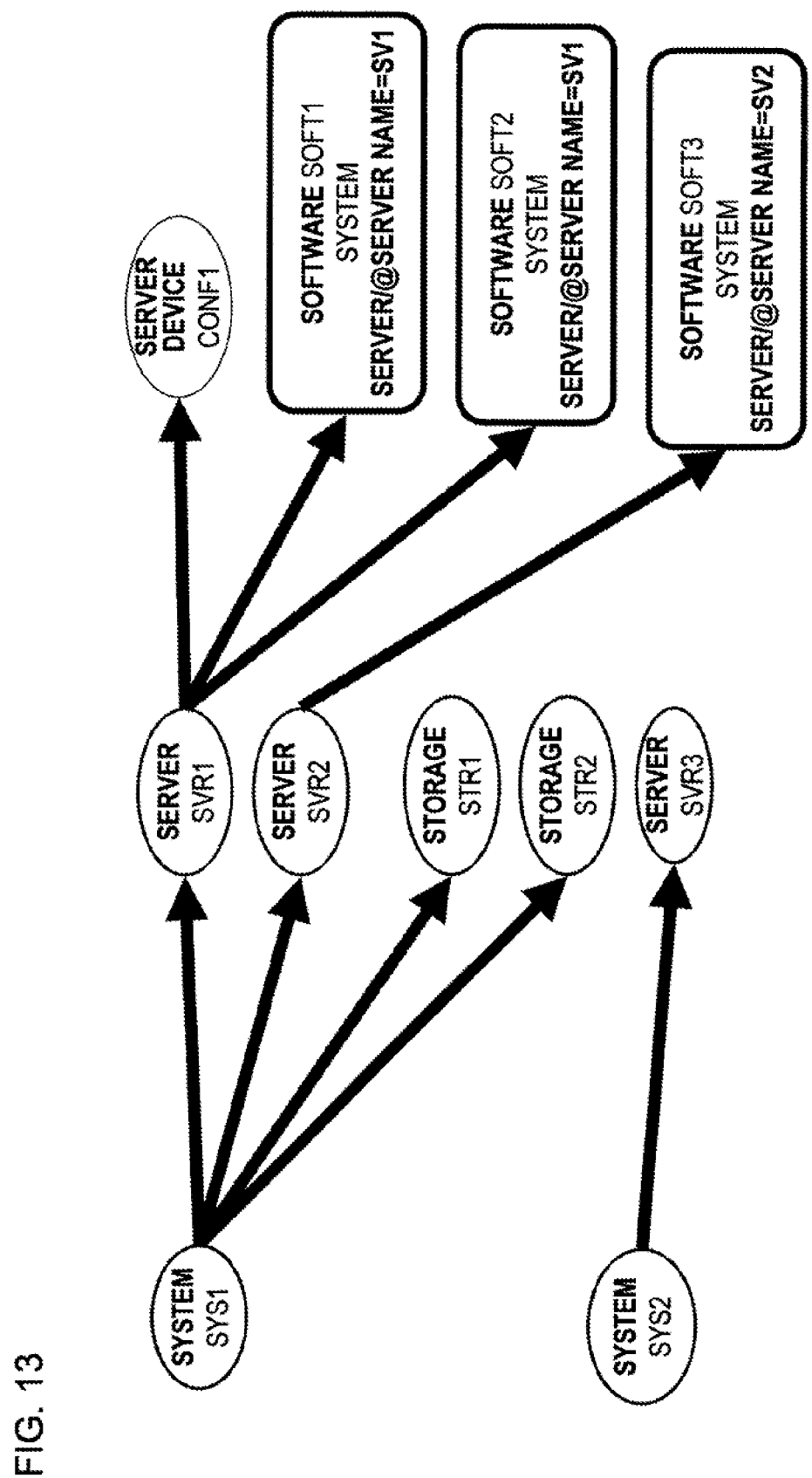
FIG. 13 is a pattern diagram illustrating a state in which a short retrieval key has been embedded in FIG. 3.

FIG. 13 is a pattern diagram illustrating a condition in which the short retrieval key has been embedded in FIG. 3.

FIG. 14 is a view illustrating software CIs in which the short retrieval key has been embedded. FIG. 14 corresponds to the software CIs of FIG. 6.

FIG. 15 is a view illustrating another method of embedding the short retrieval key illustrated in FIG. 14.

Figure 16:
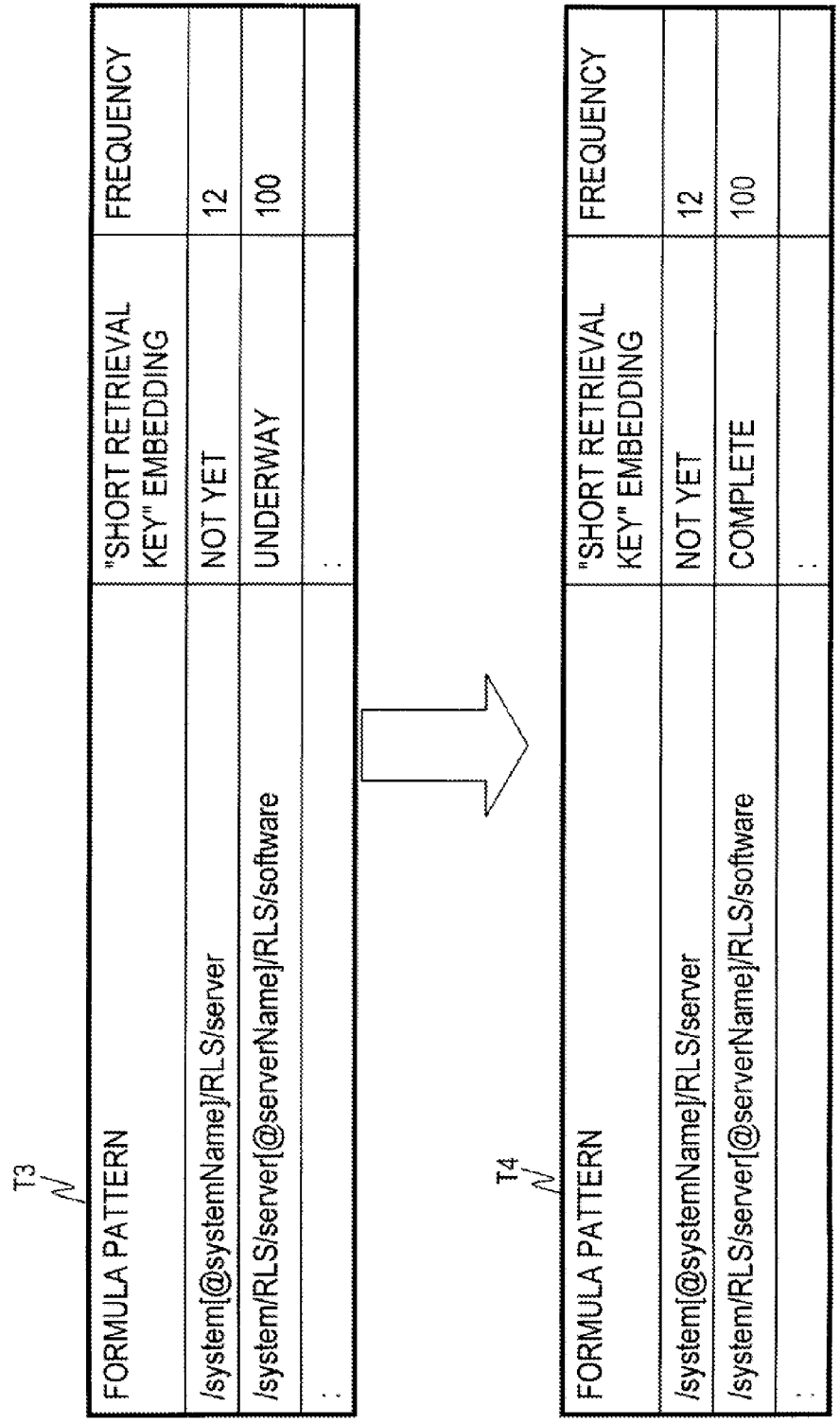
FIG. 16 is a view illustrating a retrieval formula pattern storage table in a state where the "Short Retrieval Key Embedding" section of the retrieval formula pattern storage table of FIG. 12 has been modified to "Complete"

FIG. 16 is a view illustrating a retrieval formula pattern storage table T4 in a state where the "Short Retrieval Key Embedding" section of the retrieval formula pattern storage table T3 in FIG. 12 has been modified to "Complete".

The short retrieval key embedding processing unit 234 of FIG. 9 receives the instruction to embed the short retrieval key from the retrieval frequency checking unit 233. In response to the instruction, the short retrieval key embedding processing unit 234 modifies the "Short Retrieval Key Embedding" section of the retrieval formula pattern storage table T2, in which the storage frequency equals or exceeds the predetermined frequency, to "Underway" (arrow (3-2) in FIG. 9), as illustrated in the retrieval formula pattern storage table T3 of FIG. 12.

Note that the retrieval formula pattern storage table T3 in FIG. 12 is stored in the retrieval formula pattern storage DB 212 of FIG. 9 as the retrieval formula pattern storage table T.

The short retrieval key embedding processing unit 234 of FIG. 9 retrieves all CIs in which the short retrieval key is to be embedded, from among the CIs related by the retrieval formula pattern SP1, from the FCMDB 14 (arrow (1-4) in FIG. 9). In other words, the short retrieval key embedding processing unit 234 retrieves all CIs corresponding to the retrieval, subject CI in the retrieval formula pattern SP1 satisfying the first condition from the CIs stored in the FCMDB 14.

The short retrieval key embedding processing unit 234 then stores the retrieved CIs together with the short retrieval key in the FCMDB 14. Here, the short retrieval key embedding processing unit 234 embeds the retrieval condition related to the retrieval subject CIs related by the retrieval formula pattern SP1 satisfying the first condition in the retrieved CIs as the short retrieval key.

In the example described above, the retrieval formula pattern SP1 is "/system/RLS/server[@serverName]/RLS/software". In this case, all software CIs related to a server CI having a certain server name, which is related to a certain system CI (/system/RLS/), serve as the CIs in which the short retrieval key is to be embedded.

In the example of FIG. 5 and FIG. 6, all software CIs related to a server name that is related to a certain system correspond to the CIs of the software SOFT1 to SOFT 3. These CIs serve as the CIs in which the short retrieval key is to be embedded.

The embedded short retrieval key is the retrieval condition related to the retrieval subject CIs related by the retrieval formula pattern SP1, or in other words the software CIs. In the example described above, the retrieval subject CIs are the system CIs and the server CIs.

When attribute information further specifying the retrieval condition is defined, the attribute information is also included in the short retrieval key. Hence, in the example described above, the names of the servers related to the software CIs are included in the short retrieval key.

As depicted in FIG. 13, in the example described above, the short retrieval key embedding processing unit 234 embeds "system" and "server/@serverName=SV1" in the software SOFT1, SOFT2 as the short retrieval key. Further, the short retrieval key embedding processing unit 234 embeds "system" and "server/@serverName=SV2" in the software SOFT3 as the short retrieval key.

FIG. 14 depicts software CIs in which the short retrieval key has been embedded.

As depicted in FIG. 14, the short retrieval key embedding processing unit 234 of FIG. 9 embeds the short retrieval key in software CIs identified by identification symbols item ID 21 to 23.

As depicted in FIG. 14, the short retrieval key embedding processing unit 234 embeds
<System/>
<Server serverName="SV1">
in the software CIs identified by the identification symbols item ID 21, 22 as the short retrieval key.

Further, the short retrieval key embedding processing unit 234 embeds
<System/>
<Server serverName="SV2">
in the software CI identified by the identification symbol item ID 23.

Here, the short retrieval key embedding processing unit 234 does not embed the short retrieval key in software CIs having identification symbols item ID 24, 25. The reason for this is that these software CIs are not related to the system CI and the server CI.

Note that various other short retrieval key embedding methods may be employed instead of the short retrieval key embedding method illustrated in FIG. 14. As depicted in FIG. 15, for example, the short retrieval key embedding processing unit 234 may embed
<Server serverName="SV1">
<System/>
</Server>
in the software CI as the short retrieval key. This short retrieval key denotes a software CI related to the server name SV1, which is related to a certain system. In FIG. 15, only the software CI having the identification symbol item ID 21 is illustrated, but the software CI having the identification symbol item ID 22, for example, is similar. Hence, various embedding methods may be applied instead of the short retrieval key embedding method illustrated as an example in FIG. 14.

When the short retrieval key embedding processing is complete, the short retrieval key embedding processing unit 234 of FIG. 9 modifies the "Short Retrieval Key Embedding" section in which the storage frequency equals or exceeds the predetermined storage frequency from "Underway" to "Complete", as illustrated in the retrieval formula pattern storage table T4 of FIG. 16. The retrieval formula pattern storage table T4 is then stored in the retrieval formula pattern storage DB 212 of FIG. 9 as the retrieval formula pattern storage table T.

Note that when a relationship retrieval formula "/system[@systemName="SYS1"]/RLS/server[@serverName="SVR1"]/RLS/software", for example, is input as the relationship retrieval formula, the retrieval formula pattern generation unit 232 generates a retrieval formula pattern "/system[@systemName]/RLS/server[@serverName]/RLS/software". The retrieval formula pattern generation unit 232 then updates the storage frequency by storing this retrieval formula pattern in the retrieval formula pattern storage table T.

When a relationship retrieval formula corresponding to a retrieval formula pattern having the predetermined storage frequency or greater is input thereafter, the retrieval unit 15 of FIG. 9 executes direct retrieval processing for retrieving a CI on the basis of the short retrieval key rather than through relationship retrieval.

(Execution of Direct Retrieval Processing)

Next, the direct retrieval processing will be described on the basis of FIG. 9 and FIG. 16. Note that direct retrieval will also be referred to as normal retrieval.

Execution of the direct retrieval processing will be described below using a specific example.

For example, a relationship retrieval formula RS2 is input into the data management unit 230 of the FCMDB management apparatus 200.

The relationship retrieval formula RS2 is, for example, "/system/RLS/server[@serverName='SV2']/RLS/software".

Here, both the relationship retrieval formula RS1 and the relationship retrieval formula RS2 have a server name as attribute information.

The retrieval method determination unit 235 instructs the retrieval formula pattern generation unit 232 to convert the relationship retrieval formula RS2 into a retrieval formula pattern (arrow (4-1) in FIG. 9). In response to this instruction, the retrieval formula pattern generation unit 232 converts the relationship retrieval formula RS2 into a retrieval formula pattern and outputs the retrieval formula pattern to the retrieval method determination unit 235.

The retrieval formula pattern is the retrieval formula pattern SP1, i.e. "/system/RLS/server[@serverName]/RLS/software".

The retrieval method determination unit 235 then determines whether or not the converted retrieval formula pattern exists in the retrieval formula pattern storage table T stored in the retrieval formula pattern storage DB 212 (arrow (4-2) in FIG. 9).

In this case, an identical retrieval formula pattern to the converted retrieval formula pattern exists in the "Formula Pattern" section of the retrieval formula pattern storage table T4 of FIG. 16.

Next, the retrieval method determination unit 235 of FIG. 9 determines whether or not the "Short Retrieval Key Embedding" section corresponding to the same retrieval formula pattern as the converted retrieval formula pattern has been modified to "Complete" in the retrieval formula pattern storage table T4.

In the above example of the converted retrieval formula pattern, the "Short Retrieval Key Embedding" section corresponding to "system/RLS/server[@serverName]/RLS/software" in the retrieval formula pattern storage table T4 of FIG. 16 has been modified to "Complete".

When the "Short Retrieval Key Embedding" section has been modified to "Complete", the retrieval method determination unit 235 of FIG. 9 instructs the relationship retrieval formula conversion unit 236 to convert the relationship retrieval formula RS2 into a retrieval formula for directly retrieving the retrieval subject CI in the relationship retrieval formula RS2 (arrow (4-3) in FIG. 9).

The relationship retrieval formula conversion unit 236 converts the input relationship retrieval formula into a retrieval formula for directly retrieving the retrieval subject CI. Hereafter, the converted retrieval formula will be referred to as a direct retrieval formula.

Here, when N stages of retrieval conditions exist in the relationship retrieval formula, the relationship retrieval formula is converted into a retrieval formula in which the 1, 2, 3, . . . , N stages of retrieval conditions are joined by an AND operation. Here, N stages of retrieval conditions in the relationship retrieval formula indicates a state in which N continuous "/retrieval condition/RLS/" terms exist.

The relationship retrieval formula conversion unit 236 converts the relationship retrieval formula into a formula for retrieving the retrieval subject CI which satisfies the retrieval conditions joined by the AND operation. The resulting converted formula serves as the retrieval formula for directly retrieving the retrieval subject CI.

In the relationship retrieval formula "/system/RLS/server [@serverName='SV2']/RLS/software", two stages of retrieval conditions exist.

In this case, the relationship retrieval formula conversion unit 236 converts the relationship retrieval formula into a condition formula ["system" and server/ @serverName='SV2'] in which the first stage retrieval condition system and the second stage retrieval condition "server [@serverName='SV2']" are joined by an AND operation.

The relationship retrieval formula conversion unit 236 then converts the relationship retrieval formula into "software ["system" and server/@ server name='SV2']", which is a direct retrieval formula for detecting the retrieval subject software CI that satisfies the condition formula joined by the AND operation.

This retrieval formula is a retrieval formula for retrieving software related to a certain system and (AND) the server having the server name SV1.

The relationship retrieval formula conversion unit 236 outputs the direct retrieval formula to the retrieval unit 15 (arrow (4-4) in FIG. 9). In response to input of the direct retrieval formula, the retrieval unit 15 retrieves the retrieval subject CI of the direct retrieval formula from the FCMDB 14 (arrow (1-4) in FIG. 9).

In the example described above, the retrieval unit 15 retrieves a software CI including a certain system and the server name SV2 from the FCMDB 14.

In the example of FIG. 14, the retrieval unit 15 retrieves the software CI (software name SOFT2, software ID 002) identified by the identification symbol item ID 22, and outputs the retrieval result to the data retrieval processing unit 221. The data retrieval processing unit 221 outputs the input retrieval result to the terminal apparatus system 30 via the retrieval interface unit 101.

The retrieval method determination unit 235 thus determines whether or not the retrieval formula pattern of the input second relationship retrieval formula satisfies a second condition. More specifically, when the storage frequency of the retrieval formula pattern of the second relationship retrieval formula in the retrieval formula pattern storage table T of the retrieval formula pattern storage DB 212 equals or exceeds the predetermined frequency (100 times, for example), the retrieval method determination unit 235 determines that the retrieval formula pattern of the second relationship retrieval formula satisfies the second condition.

The retrieval unit 15 then retrieves CIs in which the short retrieval key including the retrieval conditions of the second relationship retrieval formula is embedded from the CIs stored in the FCMDB 14, and retrieves the retrieval subject CI of the second relationship retrieval formula from the retrieved CIs. In other words, the retrieval unit 15 retrieves the retrieval subject CI of the second relationship retrieval formula from the CIs stored in the FCMDB 14 on the basis of the short retrieval key.

In direct retrieval based on the short retrieval key, the retrieval unit 15 retrieves a software CI stored in the FCMDB 14 and determines whether or not the software CI satisfies the retrieval conditions. As a result, the retrieval processing time can be shortened.

In the example of FIG. 14, only three software CIs embedded with the short retrieval key need be retrieved, and therefore the number of retrieval subject CIs is reduced in comparison with the relationship retrieval illustrated in FIG. 3. As a result, the retrieval processing time can be shortened.

Further, the short retrieval key is embedded only in the retrieval subject CIs of the retrieval formula pattern that satisfies the first condition. It is likely that these retrieval subject CIs are retrieved frequently and have a long retrieval processing time. Hence, by embedding the short retrieval key in these CIs alone, an increase in a CI data amount caused by the short retrieval key embedding processing can be avoided. For example, the short retrieval key may be embedded in all of the CIs. However, when the short retrieval key is embedded in all of the CIs, the CI data amount increases, and therefore a database having a larger capacity is needed. According to this embodiment, however, as noted above, an increase in the CI data amount caused by the short retrieval key embedding processing can be avoided.

Alternatively, for example,
"/system[@systemName="SYS1"]/RLS/server [@serverName="SV1"]/RLS/software"
may be input as the relationship retrieval formula. This relationship retrieval formula is a retrieval formula having a software CI related to the server name SVR1, which is related to the system name SYS1, as the retrieval subject.

The retrieval formula pattern of this relationship retrieval formula is
"/system[@systemName]/RLS/server[@serverName]/ RLS/software".

The storage frequency of this retrieval formula pattern in the retrieval formula pattern storage table T equals or exceeds the predetermined frequency. Therefore, as described above, the short retrieval key embedding processing unit 234 retrieves all of the CIs corresponding to the retrieval subject CI of the retrieval formula pattern from the CIs stored in the FCMDB 14. The short retrieval key embedding processing unit 234 then embeds a retrieval condition related to the retrieval subject CIs related by the retrieval formula pattern in the retrieved CIs.

When a relationship retrieval formula corresponding to the retrieval formula pattern of this relationship retrieval formula is input thereafter, the relationship retrieval formula conversion unit 236 converts the relationship retrieval formula into a direct retrieval formula. A relationship retrieval formula corresponding to the relationship retrieval formula of this relationship retrieval formula may be, for example, "/system[@systemName="SYS1"]/RLS/server [@serverName="SV2"]/RLS/software".

In this case, the retrieval formula pattern generation unit 232 converts the condition "/system [@systemName="SYS1"]" relating to the system CI into a conditional expression "software [system/@ system name="SYS1"]" relating to the software CI. Further, the retrieval formula pattern generation unit 232 converts the condition "server[@serverName="SV2"]" relating to the server CI into a conditional expression "software [server/@ server name="SV2"]" relating to the software CI. Next, the retrieval formula pattern generation unit 232 joins the converted condition definitions and converts them into a direct retrieval formula. In this case, the retrieval formula pattern generation unit 232 joins the two conditions such that "software [server/@ server name="SV2" and system/@ system name="SYS1"]" is obtained.

(Other CI, Relationship Formats)

FIG. 17 is a view illustrating CIs and Relationships corresponding to FIG. 5 and FIG. 6 in a table format, according to another embodiment.

FIG. 18 is a view illustrating a condition in which the short retrieval key has been embedded in a software CI in the table format of FIG. 17.

In FIGS. 4 to 6, a case in which the CIs and Relationships are stored in the FCMDB 14 in XML format was described. As depicted in FIG. 17, however, CIs and Relationships expressed in a table format, for example, instead of an XML format may be stored in the FCMDB 14.

A system CI table Ts depicted in FIG. 17 stores the identification symbol IDs, the system names, and the system IDs of the system CIs.

A server CI table Tv stores the identification symbol IDs, the server names, and the IP addresses of the server CIs.

A software CI table Tf stores the identification symbol IDs, the software names, and the software IDs of the software CIs.

A Relationship table Tr stores the identification symbol IDs of the relationship sources and the identification symbol IDs of the relationship destinations.

As illustrated in FIG. 8 and FIG. 9, the tables Ts, Tv, Tf, Tr are stored in the FCMDB 14.

By storing the CIs and Relationships in a table format, the manager can manage the CIs and Relationships easily.

As illustrated in FIG. 18, the short retrieval key embedding processing unit 234 embeds the short retrieval key into the software CI table Tf of FIG. 17. The term "(non-related)" with respect to the short retrieval key indicates that the short retrieval key is blank. Further, the term "(related)" in the row of the identification symbol ID 21, for example, indicates that the software CI having the identification symbol ID 21 is related to the "system" noted in an upper section.

(Flow of Processing for Updating Retrieval Formula Pattern Storage Table)

Figure 19:
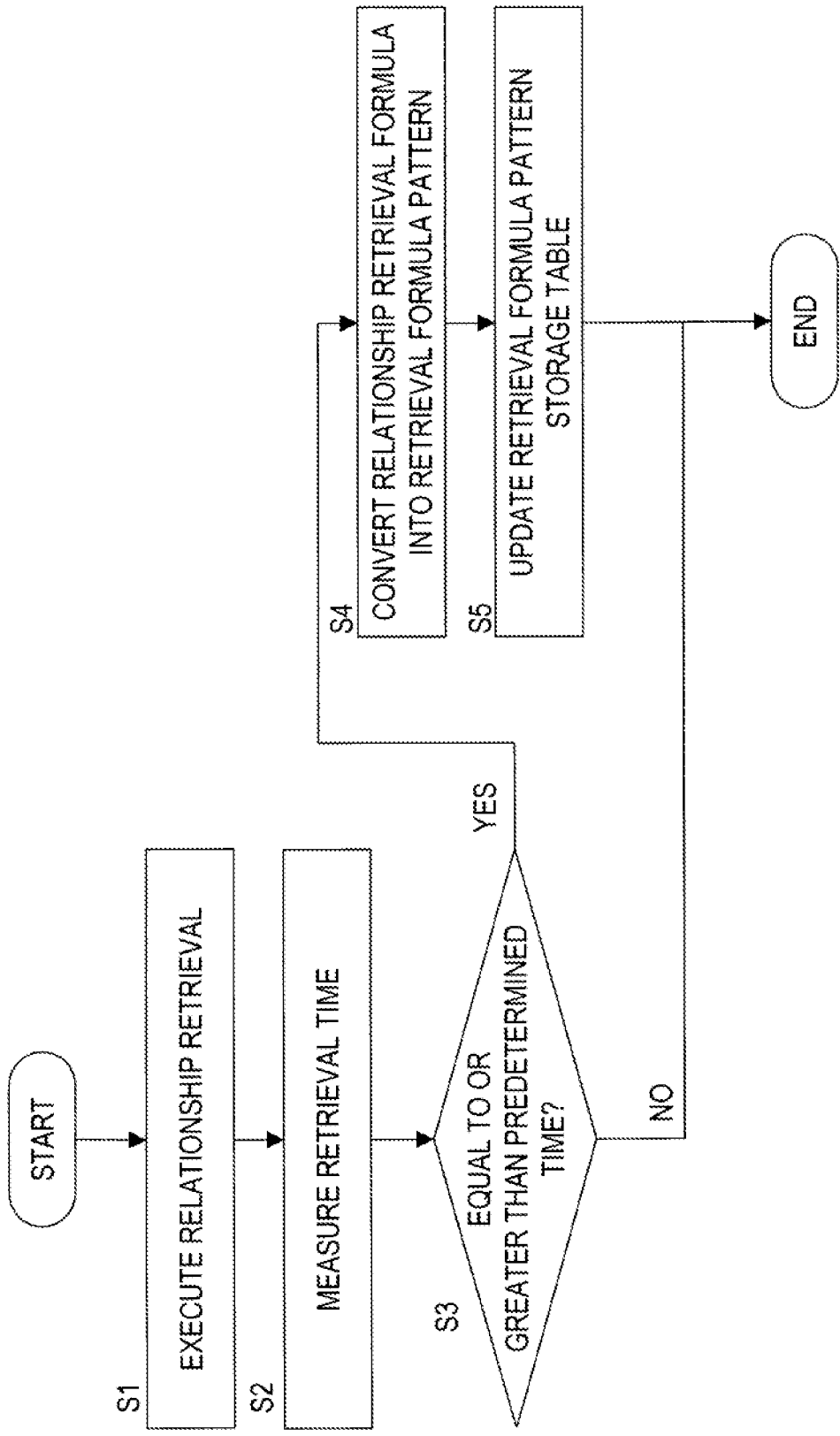
FIG. 19 is a flowchart illustrating a flow of processing for updating the retrieval formula pattern storage table illustrated in FIG. 9.

FIG. 19 is a flowchart illustrating a flow of processing for updating the retrieval formula pattern storage table illustrated in FIG. 9 according to this embodiment.

Step S1: When a relationship retrieval formula is input, the retrieval unit 15 executes relationship retrieval.

Step S2: Simultaneously, the retrieval time measurement unit 231 measures the time from input of the relationship retrieval formula into the retrieval unit 15 to output of the retrieval result.

Step S3: The retrieval time measurement unit 231 determines whether or not the retrieval time equals or exceeds the predetermined time. When the retrieval time is smaller than the predetermined time (Step S3/NO), the processing is terminated. When the retrieval time equals or exceeds the predetermined time (Step S3/YES), the processing advances to Step S4.

Step S4: The retrieval formula pattern generation unit 232 converts the input relationship retrieval formula into a retrieval formula pattern.

Step S5: The retrieval time measurement unit 231 updates the retrieval formula pattern storage table T stored in the retrieval formula pattern database DB 212.

When the processing illustrated in FIG. 19 is performed repeatedly, the frequency in the Frequency section of the retrieval formula pattern storage table reaches the predetermined frequency, for example 100 times. Accordingly, the short retrieval key embedding processing unit 234 executes the short retrieval key embedding processing. Note that the short retrieval key embedding processing unit 234 may execute the short retrieval key embedding processing when the frequency in the Frequency section of the retrieval formula pattern storage table reaches the predetermined frequency within a single day (24 hours).

(Flow of Short Retrieval Key Embedding Processing)

Figure 20:
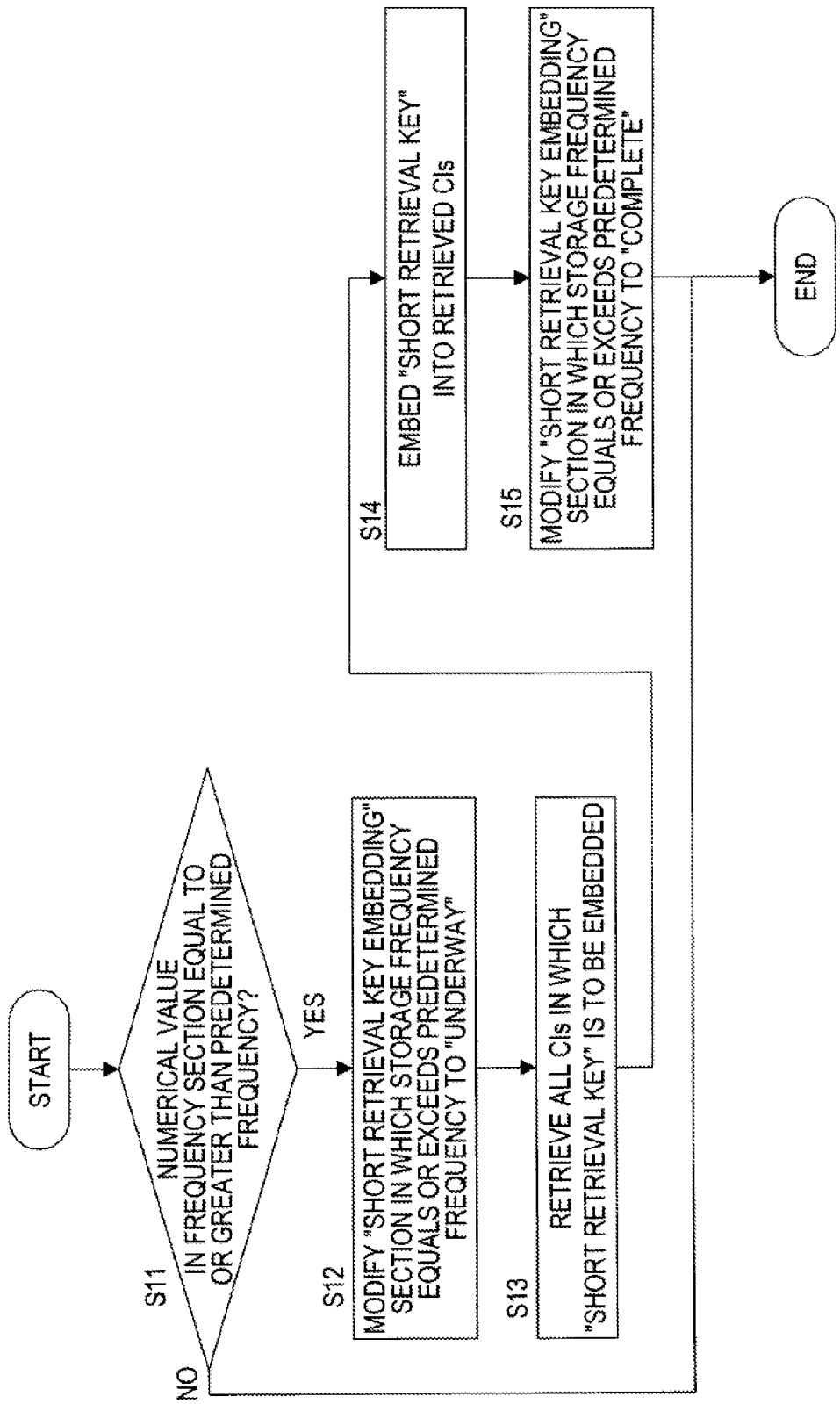
FIG. 20 is a flowchart illustrating a flow of processing for embedding the short retrieval key illustrated in FIG. 9.

FIG. 20 is a flowchart illustrating a flow of the processing for embedding the short retrieval key illustrated in FIG. 9 according to this embodiment. This processing is executed at fixed time intervals or when a predetermined retrieval frequency is reached, for example.

Step S11: The retrieval frequency checking unit 233 determines whether or not the numerical value in the Frequency section of the retrieval formula pattern storage table T equals or exceeds the predetermined frequency.

When the numerical value in the Frequency section of the retrieval formula pattern storage table T is smaller than the predetermined frequency (Step S11/No), the processing is terminated. When the numerical value in the Frequency section of the retrieval formula pattern storage table T equals or exceeds the predetermined frequency (Step S11/Yes), the processing advances to Step S12.

Step S12: The short retrieval key embedding processing unit 234 modifies the "Short Retrieval Key Embedding" section of the retrieval formula pattern storage table T in which the storage frequency equals or exceeds the predetermined frequency to "Underway".

Step S13: The short retrieval key embedding processing unit 234 retrieves all of the CIs in which the short retrieval key is to be embedded from among the CIs related by the retrieval formula pattern in which the storage frequency equals or exceeds the predetermined frequency. In other words, the short retrieval key embedding processing unit 234 retrieves all of the CIs in which the short retrieval key is to be embedded from among the CIs traced by the retrieval formula pattern in which the storage frequency equals or exceeds the predetermined frequency.

Step S14: The short retrieval key embedding processing unit 234 embeds the short retrieval key in the retrieved CIs.

Step S15: The short retrieval key embedding processing unit 234 modifies the "Short Retrieval Key Embedding" section in which the storage frequency equals or exceeds the predetermined frequency from "Underway" to "Complete".

(Flow of CI Retrieval Processing Based on Short Retrieval Key)

Figure 21:
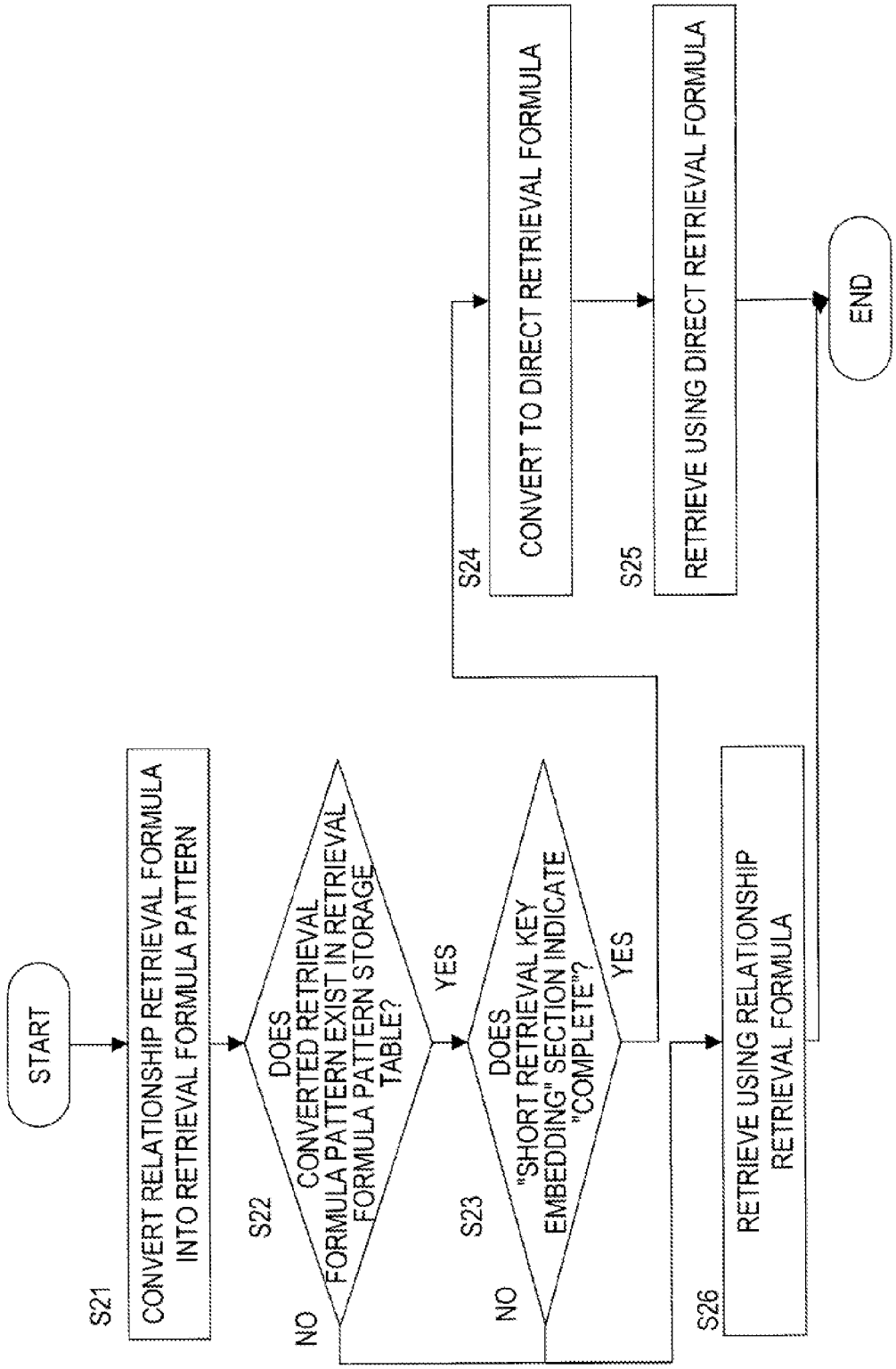
FIG. 21 is a flowchart illustrating a flow of CI retrieval processing based on the short retrieval key illustrated in FIG. 9.

FIG. 21 is a flowchart illustrating a flow of the CI retrieval processing based on the short retrieval key illustrated in FIG. 9 according to this embodiment.

Step S21: The relationship retrieval formula conversion unit 236 converts the input relationship retrieval formula into a retrieval formula for directly retrieving the retrieval subject CI in the relationship retrieval formula.

Step S22: The retrieval method determination unit 235 determines whether or not the converted retrieval formula pattern exists in the retrieval formula pattern storage table T.

Step S23: The retrieval method determination unit 235 determines whether or not the "Short Retrieval Key Embedding" section corresponding to the retrieval formula pattern in the retrieval formula pattern storage table T has been modified to "Complete". When the section has been modified to "Complete" (Step S23/Yes), the processing advances to Step S24.

Step S24: The relationship retrieval formula conversion unit 236 converts the input relationship retrieval formula into the direct retrieval formula for directly retrieving the retrieval subject CI.

Step S25: The retrieval unit 15 retrieves the retrieval subject CI corresponding to the direct retrieval formula from the FCMDB 14.

Note that when the converted retrieval formula pattern does not exist in the retrieval formula pattern storage table T (Step S22/No), the processing advances to Step S26. Further, when the "Short Retrieval Key Embedding" section corresponding to the retrieval formula pattern in the retrieval formula pattern storage table T has not been modified to "Complete" (Step S23/No), the processing advances to Step S26.

Step S26: The retrieval unit 15 executes relationship retrieval on the retrieval subject CI using the input relationship retrieval formula.

According to the first embodiment described above, the short retrieval key is stored in the configuration management database, and thereafter, configuration item retrieval processing is executed on the basis of the short retrieval key. As a result, the retrieval processing time can be shortened.

Second Embodiment

In a second embodiment, processing performed when the content of the CIs and Relationships stored in the FCMDB 14 is updated will be described. When the content of the CIs and the Relationships stored in the FCMDB 14 is updated, the content of the short retrieval key related to the update also needs to be updated. If the update is not executed, a retrieval precision of the direct retrieval processing performed on the basis of the short retrieval key decreases. This will now be described specifically on the basis of FIG. 22 and FIG. 23.

FIG. 22 is a view illustrating CIs including modified attribute information. FIG. 22 corresponds to the server CIs of FIG. 5.

FIG. 23 is a view illustrating CIs in which the attribute information has been replaced by updated attribute information. FIG. 23 corresponds to the software CIs of FIG. 14.

As depicted in FIG. 22, for example, a case in which the name SV1 of the server SVR1 in the management subject 20 of FIG. 2 has been modified to a name SV1_01 as the attribute information may be envisaged. In this case, when the name SV1 of the server SVR1 is included in the short retrieval key, the SV1 needs to be updated to the name SV1_01, as depicted in FIG. 23. The reason for this is that if a retrieval instruction having a software CI related to the server having the server name SV1_01 as the retrieval subject is received but the update has not been executed, the retrieval unit 15 of FIG. 9 does not retrieve the software CI, and therefore the retrieval precision decreases.

Updating of the attribute information will now be described on the basis of FIGS. 9, 22, and 23.

Having detected that the attribute information of the servers and software of the management subject 20 has been modified, the first MDR 11 of FIG. 9 creates new CIs including the updated attribute information, and outputs the newly created CIs to the data updating processing unit 222. The data updating processing unit 222 stores the input CIs in the FCMDB 14 via the data management unit 230.

In the example described above, as illustrated in FIG. 22, the server name serving as the attribute information of a server CI having an identification symbol item ID 11 is updated from the pre-update name "SV1" (see FIG. 5) to "SV1_01".

At this time, the data updating processing unit 222 of FIG. 9 notifies the short retrieval key updating unit 237 that the attribute information of the configuration items stored in the FCMDB 14 has been updated (arrow (5-1) in FIG. 9). In response to this notification, the short retrieval key updating unit 237 retrieves the CIs having the short retrieval key that includes the pre-update attribute information from the FCMDB 14, and replaces the pre-update attribute information of the retrieved CIs with the updated attribute information (arrow (1-4) in FIG. 9).

In the example of FIG. 22, the CIs having the short retrieval key that includes the pre-update attribute information "SV1" (server name) are the software CIs indicated by the identification symbols item ID 21, ID 22. Accordingly, the short retrieval key updating unit 237 updates the attribute information "SV1" (server name) of the short retrieval key in the software CIs having the identification symbols item ID 21, ID 22 to "SV1_01".

(Other CI and Relationship Formats)

FIG. 24 is a view illustrating CIs and Relationships in which the attribute information and the short retrieval key have been updated in a table format. In FIG. 24, the server name of the server CI indicated by the identification symbol ID 11 on the server CI table Tv has been updated to "SV_01".

In accordance with this update, as depicted in FIG. 24, the short retrieval key updating unit 237 of FIG. 9 updates the short retrieval key of the software CIs indicated by the identification symbols item ID 21, 22 on the software CI table Tf to "SV1_01".

(Flow of Short Retrieval Key Updating Processing)

Figure 25:
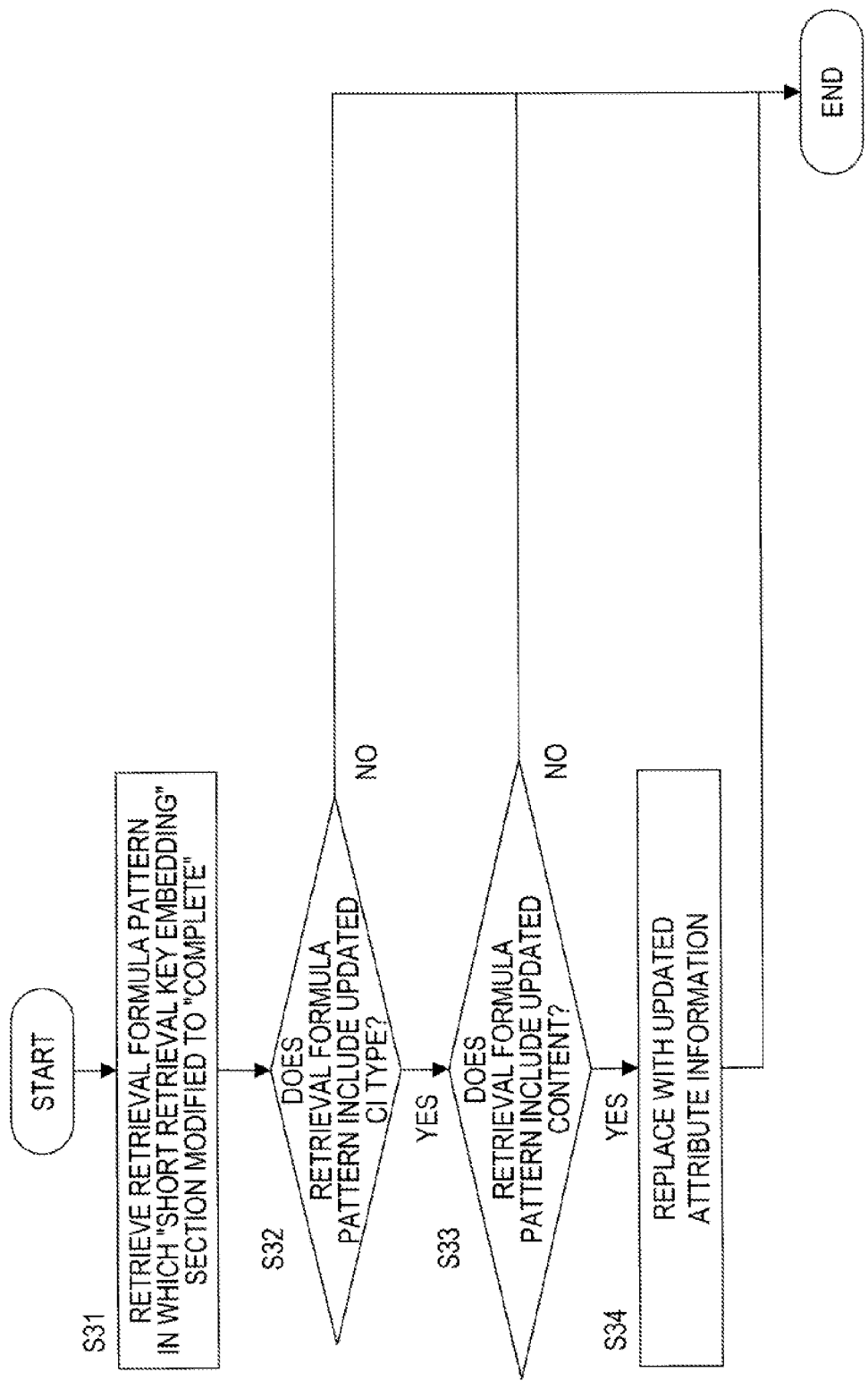
FIG. 25 is a first flowchart illustrating a flow of processing for updating the short retrieval key illustrated in FIG. 9.

FIG. 25 is a first flowchart illustrating a flow of the processing for updating the short retrieval key illustrated in FIG. 9, according to this embodiment.

Step S31: When CI updating processing is executed, the short retrieval key updating processing unit 237 retrieves a retrieval formula pattern in which the "Short Retrieval Key Embedding" section on the retrieval formula pattern storage table T4 has been modified to "Complete". In the example of the retrieval formula pattern storage table T4 in FIG. 16, the retrieval formula pattern "/system/RLS/server[@serverName]/RLS/software" is retrieved.

Step S32: The short retrieval key updating unit 237 determines whether or not the retrieved retrieval formula pattern includes the updated CI type. Here, the CI types are the system CIs, the server CIs, and the software CIs, for example. In the example of FIG. 22, the updated CI type is a server CI. The server CI is included in the aforesaid retrieval formula pattern (see "/server").

When the retrieved retrieval formula pattern includes the updated CI type (Step S32/Yes), the processing advances to Step S33.

Step S33: The short retrieval key updating unit 237 determines whether or not the retrieved retrieval formula pattern includes the updated content. In the example of FIG. 22, the updated content is the "server name". The updated content is included in the aforesaid retrieval formula pattern (see "[@serverName]").

Step S34: The short retrieval key updating unit 237 replaces the pre-update attribute information of the CI that includes the short retrieval key having the pre-update attribute information with the updated attribute information.

As described above, when the attribute information of a CI is updated, the short retrieval key can be updated in accordance with the update. As a result, the CI retrieval precision does not decrease.

(Relationship Addition)

Relationship addition will now be described on the basis of FIGS. 2, 9, 16, 26, and 27.

FIG. 26 is a view illustrating a newly created Relationship. FIG. 26 corresponds to the Relationships of FIG. 6.

FIG. 27 is a view illustrating software CIs in which the short retrieval key has been embedded. FIG. 27 corresponds to the software CIs of FIG. 14.

A relationship may be added between the servers and software in the management subject 20 of FIG. 2. For example, the software A in the management subject 20 of FIG. 2 may be newly installed in the server SVR1.

Having detected that a relationship has been added between the servers and the software in the management subject 20 (i.e. that the Relationships have been updated), the first MDR 11 of FIG. 9 creates a new Relationship indicating a relationship between a first CI and a second CI, and outputs the newly created Relationship to the data updating processing unit 222. The data updating processing unit 222 stores the input Relationship in the FCMDB 14 via the data management unit 230.

In the example described above, as illustrated in FIG. 26, a Relationship indicated by an identification symbol Rel7 has been newly added. In the example of FIG. 26, the first CI is a software CI and the second CI is a server CI. The added content indicates that a relationship exists between the server CI having the identification symbol item ID 11, illustrated in FIG. 14, and the software CI having the identification symbol item ID 24, illustrated in FIG. 14. In other words, the added content indicates that the software A has been installed in the server name SV1.

Further, the server CI having the identification symbol item ID 11 is related to a system CI having an identification symbol item ID 01. In other words, a system CI, a server CI, and a software CI are related by the newly stored Relationship.

The data updating processing unit 222 of FIG. 9 notifies the short retrieval key updating unit 237 that the Relationship indicating the relationship between the first CI and the second CI has been newly stored in the FCMDB 14 (arrow (5-1) in FIG. 9).

In response to this notification, the short retrieval key updating unit 237 of FIG. 9 retrieves a retrieval formula pattern in which the "Short Retrieval Key Embedding" section on the retrieval formula pattern storage table T4 has been modified to "Complete" (arrow (5-2) in FIG. 9).

In the example of the retrieval formula pattern storage table T4 in FIG. 16, the retrieval formula pattern "/system/RLS/server[@serverName]/RLS/software" is retrieved. This retrieval formula pattern is the retrieval formula pattern SP1 of FIG. 9.

The short retrieval key updating unit 237 then determines whether or not a first relationship between the CIs of the retrieval conditions in the retrieval formula pattern SP1 corresponds to a second relationship between the CIs related by the newly stored Relationship.

In the example described above, the first relationship is the software CI related to the server CI, which is related to the system CI.

Further, in the example described above, the CIs related by the newly stored Relationship are, as noted above, the system CI, the server CI, and the software CI. Hence, in the example described above, the second relationship is the software CI related to the server CI, which is related to the system CI.

In this case, the first relationship corresponds to the second relationship, and therefore the short retrieval key updating unit 237 embeds the retrieval conditions of the retrieval formula pattern SP1 having the first relationship (the retrieval formula pattern SP1 corresponding to the first relationship) in the newly related CIs corresponding to the retrieval subject configuration item in the retrieval formula pattern SP1 having the first relationship as the short retrieval key (arrow (1-4) in FIG. 9).

In the example described above, the newly created CIs are a system CI, a server CI, and a software CI. The retrieval subject configuration item in the retrieval formula pattern SP1 having the first relationship is a software CI. Accordingly, the short retrieval key updating unit 237 embeds the retrieval conditions of the retrieval formula pattern SP1 having the first relationship in the configuration item of the software CI. When the retrieval conditions of the retrieval formula pattern SP1 having the first relationship include attribute information at this time, the attribute information is also embedded. In the example described above, the retrieval conditions of the retrieval formula pattern include a server name as attribute information, and therefore the short retrieval key updating unit 237 embeds the server name of the server CI related to the software CI as the attribute information.

As illustrated in FIG. 27, in the example of FIG. 27, the short retrieval key updating unit 237 embeds <System/>

<Server serverName="SV1"/> in the software CI having the identification symbol item ID 24 as the short retrieval key.

(Other CI, Relationship Formats)

FIG. 28 is a view illustrating CIs and Relationships in which the Relationships have been updated, corresponding to FIG. 26 and FIG. 27, in a table format. In FIG. 28, a row having "11" as the relationship source and "24" as the relationship destination has been added to the Relationship table Tr.

In accordance with this addition, as depicted in FIG. 28, the short retrieval key updating unit 237 of FIG. 9 updates the short retrieval key of the software CI indicated on the software CI table Tf by the identification symbol ID 24 to "(Related)" in the System section and to "SV1" in a Server Name section.

(Flow of Short Retrieval Key Updating Processing)

Figure 29:
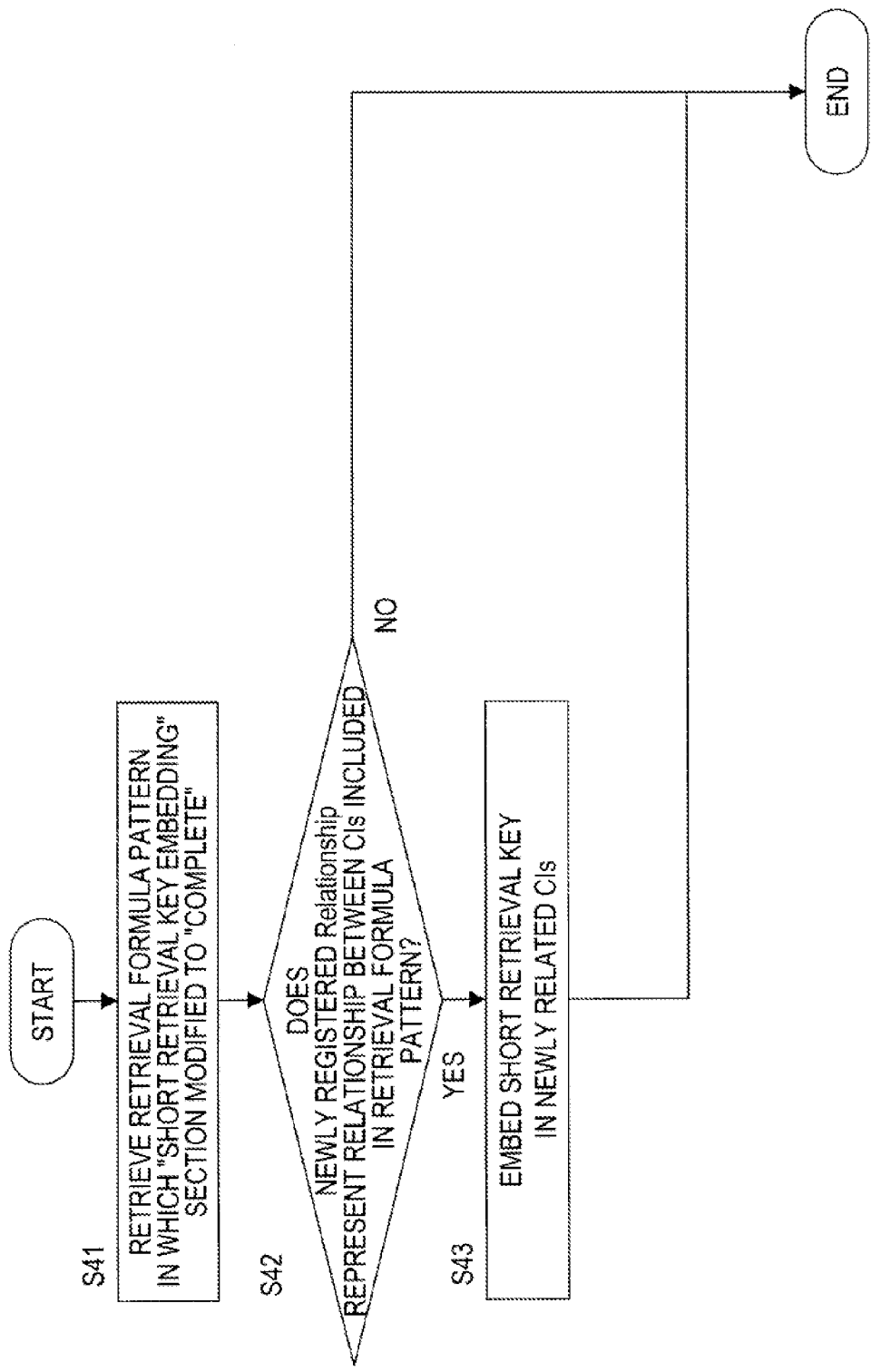
FIG. 29 is a second flowchart illustrating the flow of processing for updating the short retrieval key.

FIG. 29 is a second flowchart illustrating the flow of processing for updating the short retrieval key illustrated in FIG. 9, according to this embodiment.

Step S41: When CI updating processing is executed, the short retrieval key updating unit 237 retrieves a retrieval formula pattern in which the "Short Retrieval Key Embedding" section on the retrieval formula pattern storage table T4 has been modified to "Complete". This processing is similar to that of Step S31 in FIG. 25.

Step S42: The short retrieval key updating unit 237 determines whether or not the newly stored Relationship represents a relationship between the CIs included in the retrieval formula pattern. In other words, the short retrieval key updating unit 237 determines whether or not the first relationship between the CIs of the retrieval conditions in the retrieved retrieval formula pattern corresponds to the second relationship between the CIs related by the newly stored Relationship.

When the newly stored Relationship represents a relationship between the CIs in the retrieval formula pattern (Step S42/Yes), the processing advances to Step S43.

Step S43: The short retrieval key updating unit 237 embeds the retrieval conditions of the retrieval formula pattern having the first relationship in the newly related CIs corresponding to the retrieval subject configuration item in the retrieval formula pattern having the first relationship as the short retrieval key.

Note that when the newly stored Relationship does not represent a relationship between the CIs included in the retrieval formula pattern (Step S42/No), the processing advances to Step S43.

(Relationship Deletion)

FIG. 30 is a view illustrating a newly created Relationship. FIG. 30 corresponds to the Relationships of FIG. 6.

FIG. 31 is a view illustrating software CIs from which the short retrieval key has been deleted. FIG. 31 corresponds to the software CIs of FIG. 14.

Relationship deletion will now be described on the basis of FIGS. 2, 9, 16, 30, and 31. A relationship between the servers and the software in the management subject 20 of FIG. 2 may be deleted. For example, the software SOFT2 may be uninstalled from the server SVR1.

Having detected that a relationship between the servers and the software in the management subject 20 has been deleted (i.e. that the Relationships have been updated), the first MDR 11 of FIG. 9 creates a new Relationship which indicates that a Relationship indicating a relationship between a first CI and a second CI stored in the FCMDB 14 has been deleted, and outputs the newly created Relationship to the data updating processing unit 222. The data updating processing unit 222 stores the input Relationship in the FCMDB 14 via the data management unit 230.

In the example described above, as illustrated in FIG. 30, a Relationship indicated by an identification symbol Rel5 has been newly deleted. The deleted content indicates that the relationship between the server CI having the identification symbol item ID 11, illustrated in FIG. 5, and the software CI having the identification symbol item ID 22, illustrated in FIG. 14, has been deleted. In other words, the deleted content indicates that the software B, which was installed in the server name SV1, has been uninstalled.

The data updating processing unit 222 of FIG. 9 notifies the short retrieval key updating unit 237 that the Relationship indicating the relationship between the first CI and the second CI stored in the FCMDB 14 has been deleted (arrow (5-1) in FIG. 9). In the example of FIG. 30, the first CI is a server CI and the second CI is a software CI.

In response to this notification, the short retrieval key updating unit 237 of FIG. 9 retrieves a retrieval formula pattern in which the "Short Retrieval Key Embedding" section of the retrieval formula pattern storage table T4 has been modified to "Complete" (arrow (5-2) in FIG. 9).

In the example of the retrieval formula pattern storage table T4 of FIG. 16, the retrieval formula pattern "/system/RLS/server[@serverName]/RLS/software" is retrieved.

The short retrieval key updating unit 237 then determines whether or not a second relationship between the CIs related by the deleted Relationship is included in a first relationship between the CIs of the retrieval conditions in the retrieval formula pattern.

In the example described above, the first relationship is the software CI related to the server CI, which is related to the system CI.

Further, in the example described above, the second relationship between the CIs related by the deleted Relationship is the software CI related to the server CI.

In this case, the second relationship (the software CI related to the server CI) is included in the first relationship (the software CI related to the server CI, which is related to the system CI).

When the second relationship is included in the first relationship, the short retrieval key updating unit 237 of FIG. 9 determines whether or not the attribute information of the first CI is embedded in the second CI as the short retrieval key. Here, the first CI is the master CI of the second CI. In other words, the second CI is the slave CI of the first CI.

In the example described above, the first CI is the server CI having the identification symbol item ID 11, depicted in FIG. 5, while the second CI is the software CI having the identification symbol item ID 22, depicted in FIG. 14. Further, the attribute information (server name SV1) of the server CI having the identification symbol item ID 11, depicted in FIG. 5, is embedded in the software CI having the identification symbol item ID 22, depicted in FIG. 14, as the short retrieval key.

In this case, the short retrieval key updating unit 237 deletes the embedded short retrieval key from the second CI.

In the example of FIG. 31, the short retrieval key updating unit 237 deletes the short retrieval key from the software CI having the identification symbol item ID 22 (arrow (1-4) in FIG. 9).

(Other CI, Relationship Formats)

FIG. 32 is a view illustrating CIs and Relationships from which a Relationship has been deleted, corresponding to FIG. 30 and FIG. 31, in a table format. In FIG. 32, a row having "11" as the relationship source and "22" as the relationship destination has been deleted from the Relationship table Tr.

In accordance with this deletion, as depicted in FIG. 32, the short retrieval key updating unit 237 of FIG. 9 updates the short retrieval key of the software CI indicated on the software CI table Tf by the identification symbol ID 24 to "(Unrelated)" in the System section and to "(Unrelated)" in the Server Name section.

(Flow of Short Retrieval Key Deletion Processing)

Figure 33:
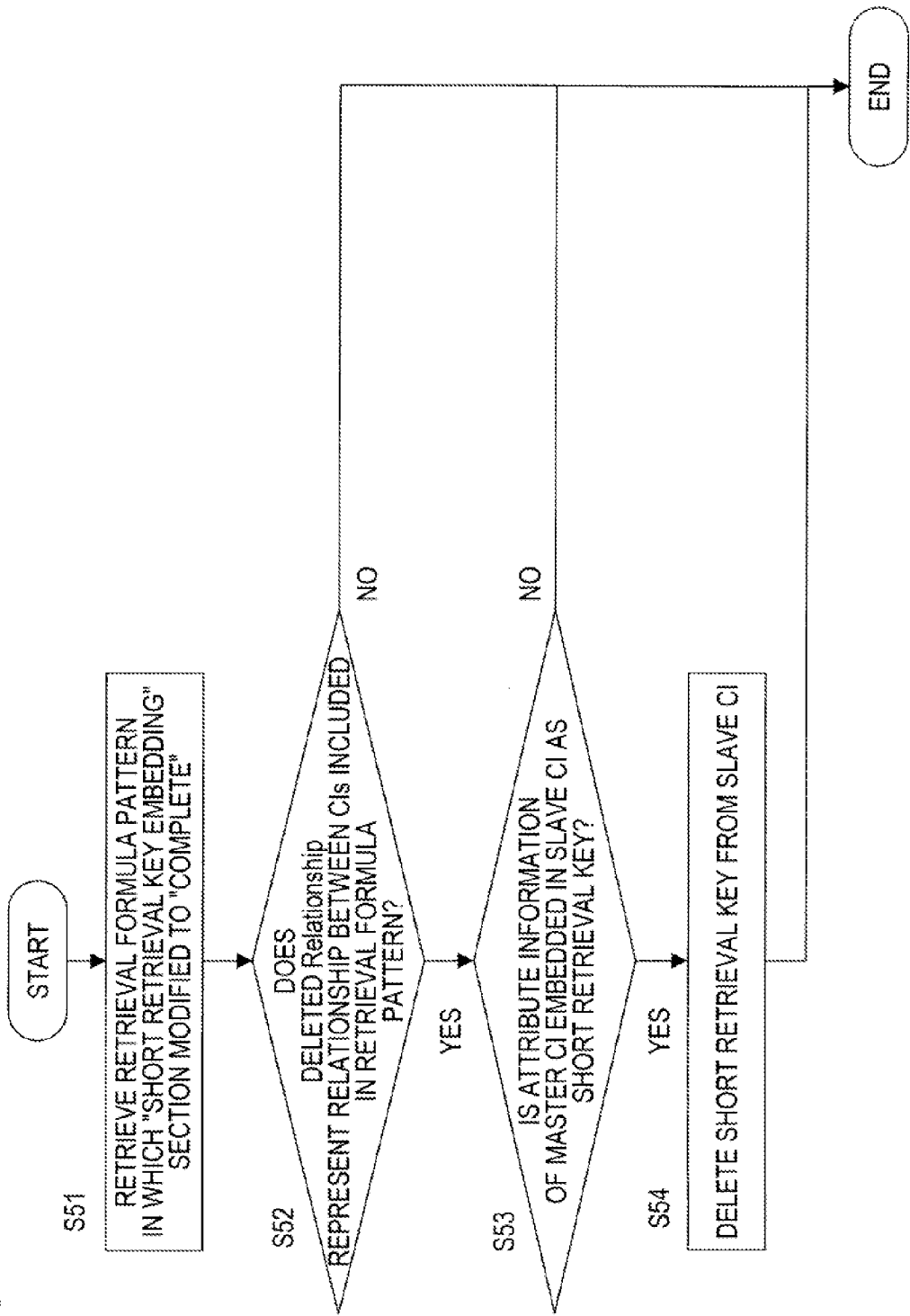
FIG. 33 is a flowchart illustrating a flow of processing for deleting the short retrieval key.

FIG. 33 is a flowchart illustrating a flow of processing for deleting the short retrieval key illustrated in FIG. 9, according to this embodiment.

Step S51: When CI updating processing is executed, the short retrieval key updating unit 237 retrieves a retrieval formula pattern in which the "Short Retrieval Key Embedding" section on the retrieval formula pattern storage table T4 has been modified to "Complete". This processing is similar to that of Step S31 in FIG. 25.

Step S52: The short retrieval key updating unit 237 determines whether or not the deleted Relationship represents a relationship between the CIs included in the retrieval formula pattern. In other words, the short retrieval key updating unit 237 determines whether or not the second relationship between the CIs related by the deleted Relationship is included in the first relationship between the CIs of the retrieval conditions in the retrieval formula pattern.

When the deleted Relationship represents a relationship between the CIs included in the retrieval formula pattern (Step S52/Yes), the processing advances to Step S53.

Step S53: The short retrieval key updating unit 237 determines whether or not, among the CIs separated by the deleted Relationship, the attribute information of the master CI is embedded in the slave CI as the short retrieval key. When, among the CIs separated by the deleted Relationship, the attribute information of the master CI is embedded in the slave CI as the short retrieval key (Step S53/Yes), the processing advances to Step S54.

Step S54: The short retrieval key updating unit 237 deletes the short retrieval key of the slave CI.

Note that when the deleted Relationship does not represent a relationship between the CIs included in the retrieval formula pattern (Step S52/No), the processing is terminated. Further, when the attribute information of the master CI is not embedded in the slave CI as the short retrieval key (Step S53/No), the processing is terminated.

Note that the short retrieval key updating unit 237 updates the short retrieval key by executing processing illustrated in FIG. 33 and FIG. 29 likewise when the relationship destination CI of the CI is modified. In FIG. 3, for example, a case in which the software SOFT2 is uninstalled from the server SV1 and installed in the server SV2 may be envisaged.

When the software SOFT2 is uninstalled from the server SV1, the software CIs and Relationships are modified. Accordingly, the short retrieval key updating unit 237 deletes the short retrieval key from the CI of the software SOFT2 by executing the processing illustrated in FIG. 33.

Next, when the software SOFT2 is installed in the server SV2, the software CIs and Relationships are updated. Accordingly, the short retrieval key updating unit 237 embeds the short retrieval key in the CI of the software SOFT2 by executing the processing illustrated in FIG. 31.

According to the second embodiment, when the content of the CIs and Relationships stored in the FCMDB 14 is updated, the content of the short retrieval key related to the update can also be updated. As a result, a reduction in retrieval precision can be suppressed.

Other Embodiments

Note that in the first and second embodiments, the CI configuration having relationships that extend three states, in other words, cases of server CIs related to system CIs and software CIs related to server CIs were described. However, the CIs may be related in four or more stages.

Figure 34:
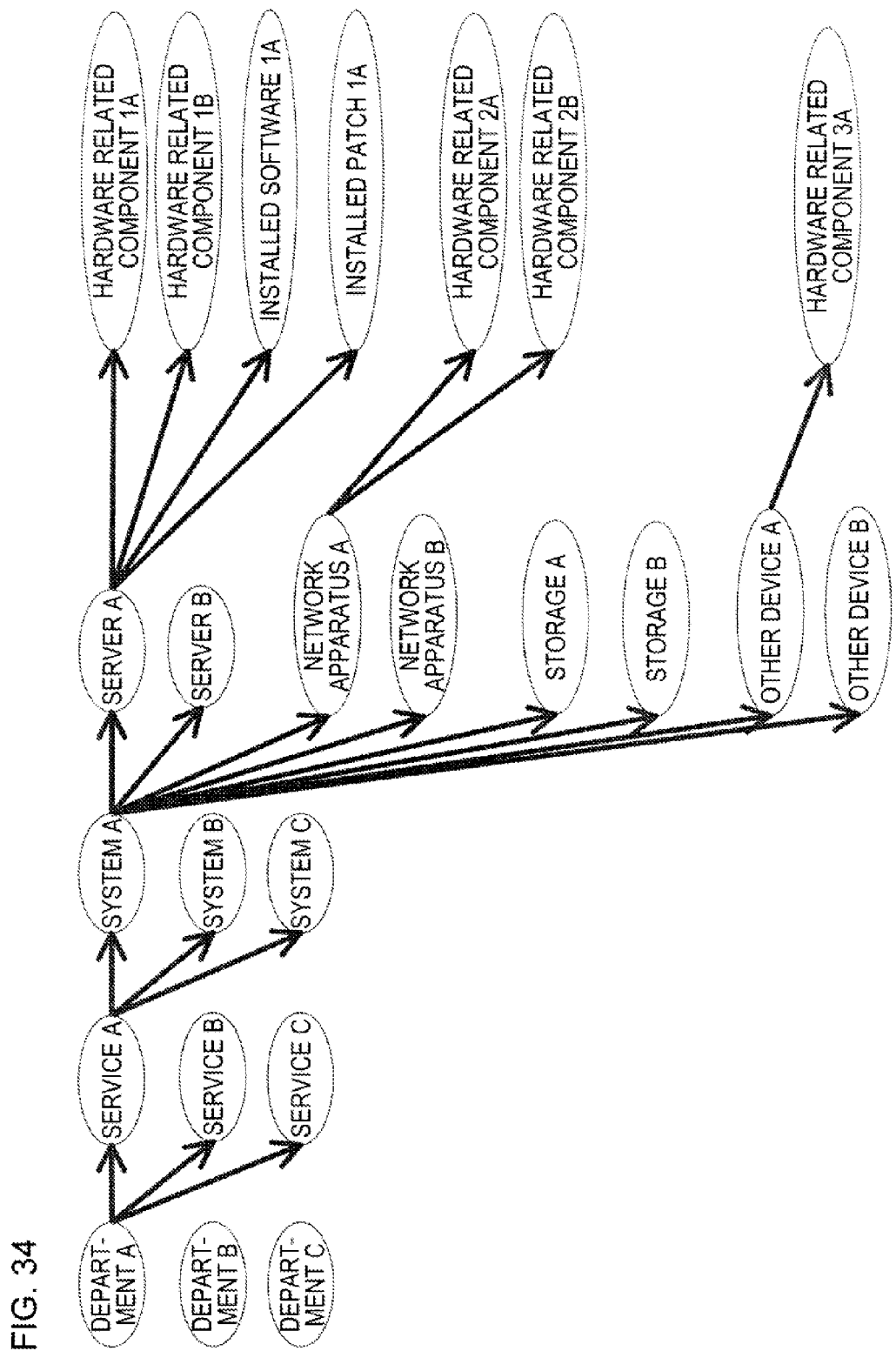
FIG. 34 is a view illustrating a CI configuration having relationships that extend over four or more stages.

FIG. 34 is a pattern diagram illustrating a CI configuration according to another embodiment, having relationships that extend over four or more stages. In the same manner as in FIG. 34, oval shapes schematically represent CIs, and arrows schematically represent Relationships.

FIG. 34 depicts CIs of departments A, B, C serving as management subjects, CIs of services A, B, C related to the department A, and CIs of systems A, B, C related to the service A. Further, FIG. 34 depicts CIs of servers A, B, CIs of network apparatuses A, B, CIs of storages A, B, and CIs of other devices A, B related to the CI of the system A. Furthermore, FIG. 34 depicts CIs of hardware related components 1A, 1B related to the CI of the server A, a CI of software 1A installed in the server A, and a CI of a patch 1A installed in the server 1A. Moreover, FIG. 34 depicts CIs of hardware related components 2A, 2B related to the CIs of the network apparatuses A, B, and a CI of a hardware related component 3A related to the CI of the other device A. Although not depicted in the drawing, a larger number of CIs and Relationships than the number of CIs and Relationships in FIG. 34 may exist. For example, approximately ten department CIs may exist, approximately ten service CIs may be related to each department CI, and approximately five system CIs may be related to each service CI. Further, approximately twenty CIs may be related to each system and approximately one hundred CIs may be related to these CIs.

When CIs having this type of multistage configuration are stored in the FCMDB 14 and relationship retrieval is executed on a terminal end CI (a CI on the right side of the drawing), the relationships between the CIs increase in length, leading to an increase in the retrieval time. With the FCMDB management apparatus according to this embodiment, the short retrieval key is embedded in retrieval subject CIs for which the retrieval processing time tends to be long and the retrieval frequency tends to be high. Thereafter, retrieval processing is executed on the basis of the short retrieval key, and as a result, the retrieval time is shortened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A configuration information management apparatus comprising:
    a first database that stores each attribute information of a plurality of configuration items and relationship item information expressing relationships between the configuration items in a plurality of stages;
    a second database that stores a retrieval formula pattern representing a pattern of a relationship retrieval formula and a storage frequency of the retrieval formula pattern; and
    a processing unit that, in response to an input of a relationship retrieval formula in which a plurality of configuration items are related by a retrieval condition, retrieves a retrieval subject configuration item from the first database by tracing the relationship item information between the configuration items,
    wherein the processing unit generates a retrieval formula pattern representing a pattern of a first relationship retrieval formula which has been input,
    measures a retrieval processing time required to retrieve the retrieval subject configuration item by tracing the relationship item information between the configuration items in the first relationship retrieval formula, and when the retrieval processing time which has been measured equals or exceeds a predetermined time, stores the retrieval formula pattern of the first relationship retrieval formula in the second database,
    determines whether the storage frequency of the retrieval formula pattern of the relationship retrieval formula stored in the second database equals or exceeds a predetermined frequency,
    determines that the retrieval formula pattern having the predetermined frequency or greater is a retrieval formula pattern satisfying a first condition,
    and when the first condition is satisfied, stores the retrieval condition relating to the retrieval subject configuration item in the retrieval formula pattern satisfying the first condition in the first database as a short retrieval key, and retrieves, when a second relationship retrieval formula is input and a retrieval formula pattern of the second relationship retrieval formula satisfies a second condition, the retrieval subject configuration item in the second relationship retrieval formula, on the basis of the short retrieval key.

2. The configuration information management apparatus according to claim 1, wherein the relationship retrieval formula defines the retrieval subject configuration item, a configuration item retrieval condition relating to the retrieval subject configuration item, and attribute information further specifying the retrieval condition, and the processing unit generates the retrieval formula pattern by deleting the attribute information from an input relationship retrieval formula which has been input.

3. The configuration information management apparatus according to claim 1, wherein the processing unit embeds, in a configuration item that is stored in the first database and corresponds to the retrieval subject configuration item in the retrieval formula pattern satisfying the first condition, a retrieval condition relating to the retrieval subject configuration item as the short retrieval key.

4. The configuration information management apparatus according to claim 3, wherein, when the attribute information of a configuration item stored in the first database is updated, the processing unit retrieves a configuration item having the short retrieval key that includes pre-update attribute information and replaces the pre-update attribute information of the retrieved configuration item with the updated attribute information.

5. The configuration information management apparatus according to claim 3, wherein, when relationship item information indicating a relationship between a configuration item and another configuration item is newly stored in the first database, the processing unit determines whether or not a first relationship between the configuration items of the retrieval conditions in the retrieval formula pattern stored in the second database corresponds to a second relationship between the configuration items newly related by the newly stored relationship item information, and when the first relationship corresponds to the second relationship, embeds the retrieval condition of the retrieval formula pattern of the first relationship as the short retrieval key in the newly related configuration items corresponding to the retrieval subject configuration items in the retrieval formula pattern of the first relationship.

6. The configuration information management apparatus according to claim 3, wherein, when relationship item information indicating a relationship between a first configuration item and a second configuration item stored in the first database is deleted, the processing unit determines whether or not a second relationship indicating the relationship between the first configuration item and the second configuration item is included in a first relationship between the configuration items of the retrieval conditions in the retrieval formula pattern stored in the second database, determines whether or not the attribute information of the first configuration item is embedded in the second configuration item as the short retrieval key when the second relationship is included in the first relationship, and deletes the short retrieval key from the second configuration item when the attribute information of the first configuration item is embedded in the second configuration item as the short retrieval key.

7. The configuration information management apparatus according to claim 1, wherein, when the storage frequency of the retrieval formula pattern of the second relationship retrieval formula in the second database equals or exceeds the predetermined frequency, the processing unit determines that the retrieval formula pattern of the second relationship retrieval formula satisfies the second condition.

8. The configuration information management apparatus according to claim 1, wherein the first database stores the configuration items and the relationship item information as information described in an XML format.

9. The configuration information management apparatus according to claim 1, wherein the first database stores the configuration items and the relationship item information as information described in a table format.

10. A computer-readable, non-transitory recoding medium having stored therein a retrieval program that causes a computer to execute a process comprising:

retrieving, in response to an input of a relationship retrieval formula in which a plurality of configuration items are related by a retrieval condition, a retrieval subject configuration item from a first database which stores each attribute information of a plurality of configuration items and relationship item information expressing relationships between the configuration items in a plurality of stages, by tracing the relationship item information between the configuration items;

generating a retrieval formula pattern representing a pattern of a first relationship retrieval formula which has been input;

measuring a retrieval processing time required to retrieve the retrieval subject configuration item by tracing the relationship item information between the configuration items in the first relationship retrieval formula, storing the retrieval formula pattern of the first relationship retrieval formula in a second database when the retrieval processing time which has been measured equals or exceeds a predetermined time, determining whether a storage frequency of the retrieval formula pattern of the relationship retrieval formula stored in the second database equals or exceeds a predetermined frequency, determining that the retrieval formula pattern having the predetermined frequency or greater is a retrieval formula pattern satisfying a first condition, and storing the retrieval condition relating to the retrieval subject configuration item in the retrieval formula pattern satisfying the first condition in the first database as a short retrieval key, when the first condition is satisfied;

wherein the retrieving comprises retrieving, when a second relationship retrieval formula is input and a retrieval formula pattern of the second relationship retrieval formula satisfies a second condition, the retrieval subject configuration item in the second relationship retrieval formula on the basis of the short retrieval key.

11. A retrieval method comprising:

retrieving, in response to an input of a relationship retrieval formula in which a plurality of configuration items are related by a retrieval condition, a retrieval subject configuration item from a first database which stores each attribute information of a plurality of configuration items and relationship item information expressing relationships between the configuration items in a plurality of stages, by tracing the relationship item information between the configuration items;

generating a retrieval formula pattern representing a pattern of a first relationship retrieval formula which has been input;

measuring a retrieval processing time required to retrieve the retrieval subject configuration item by tracing the relationship item information between the configuration items in the first relationship retrieval formula, storing the retrieval formula pattern of the first relationship retrieval formula in a second database when the retrieval processing time which has been measured equals or exceeds a predetermined time, determining whether a storage frequency of the retrieval formula pattern of the relationship retrieval formula stored in the second database equals or exceeds a predetermined frequency, determining that the retrieval formula pattern having the predetermined frequency or greater is a retrieval formula pattern satisfying a first condition, and storing the retrieval condition relating to the retrieval subject configuration item in the retrieval formula pattern satisfying the first condition in the first database as a short retrieval key, when the first condition is satisfied;

wherein the retrieving comprises retrieving, when a second relationship retrieval formula is input and a retrieval formula pattern of the second relationship retrieval formula satisfies a second condition, the retrieval subject configuration item in the second relationship retrieval formula on the basis of the short retrieval key.

* * * * *